United States Patent
Chelian et al.

(10) Patent No.: US 10,133,983 B1
(45) Date of Patent: Nov. 20, 2018

(54) METHOD AND APPARATUS FOR MODELING PROBABILITY MATCHING AND LOSS SENSITIVITY AMONG HUMAN SUBJECTS IN A RESOURCE ALLOCATION TASK

(71) Applicant: HRL Laboratories, LLC, Malibu, CA (US)

(72) Inventors: Suhas E. Chelian, Encino, CA (US); Stephanie E. Goldfarb, Santa Monica, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 635 days.

(21) Appl. No.: 14/693,485

(22) Filed: Apr. 22, 2015

Related U.S. Application Data

(63) Continuation-in-part of application No. 14/334,649, filed on Jul. 17, 2014, now Pat. No. 9,552,544.

(60) Provisional application No. 61/885,641, filed on Oct. 2, 2013, provisional application No. 61/982,696, filed on Apr. 22, 2014.

(51) Int. Cl.
  *G06N 3/08* (2006.01)
  *G06N 7/00* (2006.01)
  *G06N 3/12* (2006.01)

(52) U.S. Cl.
  CPC ............ *G06N 7/005* (2013.01); *G06N 3/08* (2013.01); *G06N 3/126* (2013.01)

(58) Field of Classification Search
  CPC ........... G06N 7/005; G06N 3/08; G06N 3/126
  USPC .............................................. 706/19
  See application file for complete search history.

(56) References Cited

U.S. PATENT DOCUMENTS

| | | | |
|---|---|---|---|
| 6,769,066 B1 | 7/2004 | Botros | |
| 7,464,410 B1 | 12/2008 | Halasz | |
| 7,487,544 B2 | 2/2009 | Schultz | |
| 8,301,770 B2 | 10/2012 | van Coppenolle | |
| 2003/0051026 A1 | 3/2003 | Carter | |
| 2007/0239314 A1 | 10/2007 | Kuvich | |
| 2009/0131758 A1* | 5/2009 | Heywood | A61B 5/0002 600/300 |
| 2014/0058988 A1 | 2/2014 | Lai | |
| 2014/0222743 A1* | 8/2014 | Baughman | G06N 5/02 706/46 |

OTHER PUBLICATIONS

"On Adaptation, Maximization, and Reinforcement Learning Among Cognitive Strategies", Ido Erev, Greg Barron, Psychological Review, 2005, vol. 112, No. 4, pp. 912-931.*

(Continued)

*Primary Examiner* — Paulinho E Smith
(74) *Attorney, Agent, or Firm* — Tope-McKay & Associates

(57) ABSTRACT

Described is system for modeling probability matching and loss sensitivity among human subjects. A set of features related to probability matching and loss sensitivity is extracted from collected human responses. The set of features are processed with a genetic algorithm to fit the collected human responses with a set of neural network model instances. A set of model parameters are generated from the genetic algorithm and used to generate at least one of an explanatory and predictive model of human behavior.

14 Claims, 11 Drawing Sheets

(56) References Cited

OTHER PUBLICATIONS

Chelian, S.E., Bhattacharyya, R., & O'Reilly, R. (2011). Learning categories with invariances in a neural network model of prefrontal cortex. In Proceedings of the Second Annual Meeting of the BICA Society (BICA 2011), Arlington, USA, pp. 50-55.
Erev, I. & Barron, G. (2005). On adaptation, maximization, and reinforcement learning among cognitive strategies. Psychological review, 112, pp. 912-931.
Frank, M.J., Seeberger, L. & O'Reilly, R.C. (2004). By carrot or by stick: cognitive reinforcement learning in Parkinsonism. Science, 306, pp. 1940-1943.
Herd, S.A., Krueger, K.A., Kriete, T.E., Huang, T. & O'Reilly, R.C. (2013). Strategic cognitive sequencing: a computational cognitive neuroscience approach. Computational Intelligence and Neuroscience, 149329, pp. 1-18.
Lee, M.D., Zhang, S., Munro, M. & Steyvers, M. (2011). Psychological models of human and optimal performance in bandit problems. Cognitive Systems Research, 12, pp. 164-174.
O'Reilly, R.C. & Frank, M.J. (2006). Making working memory work: a computational model of learning in the frontal cortex and basal ganglia. Neural Computation, 18, pp. 283-328.
Sul, J.H., Kim, H., Huh, N., Lee, D., & Jung, M.W. (2010). Distinct roles of rodent orbitofrontal and medial prefrontal cortex in decision making. Neuron, 66, pp. 449-460.
Walton M.E. Behrens, T.E. Buckley, M.J., Rudebeck, P.H., & Rushworth, M.F. (2010). Separable learning systems in the macaque brain and the role of orbitofrontal cortex in contingent learning. Neuron, 65, pp. 927-939.
Wunderlich, K., Rangel, A., & O'Doherty, J.P. (2009). Neural computations underlying action-based decision making in the human brain. Proceedings of the National Academy of Sciences, 106, pp. 17199-17204.
Burns, K. and Bonaceto, C. (2014) MITRE Technical Report. Integrated cognitive-neuroscience architectures for understanding sensemaking (ICArUS): phase 2 challenge problem design and test specification, pp. 1-39.
Bates, M. (2002). Toward an integrated model of information seeking and searching. New Review of Information Behaviour Research, 3, pp. 1-15.
Chelian, S.E., Oros, N., Zaldivar, A., Krichmar, J., & Bhattacharyya, R. (2012). Model of the interactions between neuromodulators and prefrontal cortex during a resource allocation task. In Proceedings of the IEEE International Conference on Development and Learning and Epigenetic Robotics (IEEE ICDL-EpiRob 2012), pp. 1-6, San Diego, USA.
Goldfarb, S.E., Chelian, S.E., Cohen, J.D. & Bhattacharyya, R. (2013). Modeling of subject independent and dependent cognitive biases in a resource allocation task. In Proceedings of the Society for Neuroscience (SfN 2013), San Diego, USA, Abstract only.
Lebiere, C. (1999). The dynamics of cognition: An ACT-R model of cognitive arithmetic. Kognitionswissenchaft, 8, pp. 5-19.
Lebiere, C., Pirolli, P., Thomson, R., Paik, J., Rutledge-Taylor, M., Staszewski, J., & Anderson, J.R. (2013). A functional model of sensemaking in a neurocognitive architecture. Computational Intelligence Neuroscience, 921695, pp. 1-28.
Lee, D., Seo, H., & Jung, M.W. (2012). Neural basis of reinforcement learning and decision making. Annual Review of Neuroscience, 35, pp. 287-308.
Litt, A., Eliasmith, C., Thagard, P. (2008). Neural affective decision theory: choices, brains, and emotions. Cognitive Systems Research, 9, pp. 252-273.
Pirolli, P. (2007). Information foraging: A theory of adaptive interaction with information. New York: Oxford University Press, pp. 89-110.
Resnikoff, H.L. (1989). The illusion of reality. New York: Springer-Verlag, p. 97.

Schmitzer-Torbert, N. (2007). Place and response learning in human virtual navigation: Behavioral measures and gender differences. Behavioral Neuroscience, 121, pp. 277-290.
J. Krichmar, "The neuromodulatory system—a framework for survival and adaptive behavior in a challenging world," Adaptive Behavior, vol. 16, No. 6, pp. 385-399, Dec. 2008.
W. Schultz, "Dopamine neurons and their role in reward mechanisms," Curr. Opin. Neurobiol., vol. 7, No. 2, pp. 191-197, Apr. 1997.
K. Berridge, "Motivation concepts in behavioral neuroscience, " Physiol. Behav., vol. 81, No. 2, pp. 179-209, Apr. 2004.
M. Millan. "The neurobiology and control of anxious states," Prog. Neurobiol., vol. 70, No. 2, pp. 83-244, Jun. 2003.
M. Crockett, L. Clark, G. Tabibnia, M. Lieberman, and T. Robbins, "Serotonin modulates behavioral reactions to unfairness," Science, vol. 320, No. 5884, p. 1739 and supplement pp. 1-7, Jun. 2008.
A. Chiba, D. Bucci, P. Holland, and M. Gallagher, "Basal forebrain cholinergic lesions disrupt increments but not decrements in conditioned stimulus processing," J. Neurosci., vol. 15, No. 11, pp. 7315-7322, Nov. 1995.
M. Baxter, P. Holland, and M. Gailagher, "Disruption of decrements in conditioned stimulus processing by selective removal of hippocampal cholinergic input," J. Neurosci., vol. 17, No. 13, pp. 5230-5236, Jul. 1997.
R. Ross, J. McGaughy, and H. Eichenbaum, "Acetylcholine in the orbitofrontal cortex is necessary for the acquisition of a socially transmitted food preference," Learn. Mem., vol. 12, No. 3. pp. 302-306, May 2005.
P. Rudebeck, M. Walton, A. Smyth, D. Bannerman, and M. Rushworth, "Separate neural pathways process different decision costs," Nature Neurosci., vol. 9, No. 9, pp. 1161-1168, Aug. 2006.
M. Rushworth, T. Behrens, P. Rudebeck, and M. Walton, "Contrasting roles for cingulated and orbitofrontal cortex in decisions and social benavior," Trends in Cog. Sci., vol. 11, No. 4, pp. 168-176, Apr. 2007.
N. Oros, A. Chiba, D. Nitz, M. Avery, and J. Krichmar, "Simulation of the neuromodulatory pathways responsible for incrementing and decrementing attention during reversal learning and set-shifting," In Proceeding of the Society for Neuroscience, Washington, D.C., 2011, one page.
A. Zaldivar, D. Asher, and J Krichmar, "Simulation of how neuromodulation influences cooperative behavior," in Simulation of Adaptive Behavior: From Animals to Animats. Lecture Notes on Artificial Intelligence. Berlin, Germany, Springer-Verlag, 2010, pp. 649-660.
A. Niculescu-Mizil, "Multi-armed bandits with betting—on-line learning with limited feedback," in Conferonee on Learning Theory, Montreal, 2009, pp. 1-4.
R. Cools, K. Nakamura, and N. Daw, "Serotonin and dopamine: unifying affective, activational, and decision functions," Neuropsychopharm., vol. 36, No. 1, pp. 98-113, Jan. 2011.
F. Denk et al., "Differential involvement of serotonin and dopamine systems in cost-benefit decisions about delay or effort," Psychopharm. vol. 179, No. 3, pp. 587-596, Dec. 2005.
P. Roussos, S. Giakoumaki, S. Pavlakis, and P. Bitsios, "Planning, decision-making and the COMT rs4816 polymorphism in healthy males," Neuropsychologia, vol. 46, No. 2, pp. 757-763, Oct. 2008.
W. Alexander and J. Brown, "Computational models of performance monitoring and cognitive control, " Topics in Cognitive Sci., vol. 2, No. 4, pp. 658-677, Apr. 2010.
M. Botvinick, T. Braver, D. Barch, C. Carter, J. Cohen, "Conflict monitoring and cognitive control" Psychological Rev., vol. 108, No. 3, pp. 624-665, Jul. 2001.
M. Sakagami, X. Pan and B. Util. "Behavioral inhibition and prefrontal cortex in decision-making," Neural Networks, vol. 19, No. 8, pp. 1255-1265, Sep. 2006.
M. Lebedev, and S. Wise, "Insights into seeing and grasping: distinguishing the neural correlates of perception and action," Behav. Cogn. Neurosci. Rev., vol. 1, No. 2, pp. 108-129, Jun. 2002.

(56) References Cited

OTHER PUBLICATIONS

S. Haber, K. Kim, P. Mailly, R. Calzavara, "Reward-related cortical inputs define a large striatal region in primates that interface with associative cortical connections, proving a substrate for incentive-based learning:" J. Neurosci., vol. 26, No. 32, pp. 8368-8376, Aug. 2006.
T. Robbins and A. Roberts, "Differential regulation of front-executive function by the monoamines and acetylcholine," Cerebral Cortex, vol. 17, No. supplement 1, pp. I151-I160, Sep. 2007.
J. Alcaraz and C. Maroto, "A robust genetic algorithm for resource allocation in project scheduling," Annals of Operations Res., vol. 102, No. 1, pp. 83-109, Feb. 2001.
A. Litt, C. Eliasmith, P. Thagard, "Neural affective decision theory: choices, brains, and emotions," Cognitive Systems Res., vol. 9, No. 4, pp. 252-273, Oct. 2008.
G. Loewenstein, S. Rick, and J. Cohen, "Neuroeconomics," Annu. Rev. Psychol., vol. 59, No. 1, pp. 647-672, Jan. 2008.
C. Breitenstein et al., "Tonic dopaminergic stimulation impairs associative learning in healthy subjects" Neuropsychopharm., vol. 31, No. 11, pp. 2552-2564, Jul. 2006.
G. Aston-Jones G and J. Cohen, "An integrative theory of locus coeruleus-norepinephrine function: adaptive gain and optimal performance," Annu. Rev. Neurosci., vol. 28, No. 1, pp. 403-450, Jul. 2008.
A. Dombrovski et al., "Reward/punishment reversal learning in older suicide attempters," Am. J. Psychiatry., vol. 167, No. 6, pp. 699-707, Jun. 2010.
F. Jollant et al., "Impaired decision making in suicide attempters," Am. J. Psyohiatry., vol. 162, No. 2, pp. 304-310, Feb. 2005.
A. Bechara, A., Damásio, H. Damásio, S. Anderson, "Insensitivity to future consequences following damage to human prefrontal cortex," Cognition, vol. 50, No. 1-3, pp. 7-15, Apr.-Jun. 1994.
H. Markram and M. Tsodyks, "Redistribution of synaptic efficacy between neocortical pyramidal neurons," Nature, vol. 382, No. 6594, pp. 807-810, Aug. 1996.
Gail A Carpenter and W. Ross. Art-emap: A neural network architecture for learning and prediction by evidence accumulation. IEEE Transactions on Neural Networks, 6(4): pp. 805-818, Jul. 1995.
Peter Redgrave. Basal ganglia. Scholarpedia, 2(6):1825, 2007, pp. 1-21.
Charles S Carver and Teri L White. Behavioral inhibition, behavioral activation, and affective responses to impending reward and punishment: The BIS/BAS scales. Journal of personality and social psychology, 67(2), pp. 319-333, 1994.
Suhas E Chelian, Nicolas Oros, Andrew Zaldivar, Jeffrey L Krichmar, and Rajan Bhattacharyya. Model of the interactions between neuromodulators and prefrontal cortex during a resource allocation task. In Development and Learning and Epigenetic Robotics (ICDL), 2012 IEEE International Conference on, pp. 1-6. IEEE, 2012.
Ido Erev and Greg Barron. On adaptation, maximization, and reinforcement learning among cognitive strategies. Psychological review, 112(4), pp. 912-931, 2005.
Daniel Kahneman and Amos Tversky. Choicies, values, and frames. American psychologist, 39(4) pp. 341-350. 1984.
Donald Laming, Choice reaction performance following an error. Acta Psychologica, 43(3), pp. 199-224, 1979.

Michael D Lee, Shunan Zhang, Miles Munro, and Mark Steyvers. Psychological models of human and optimal performance in bandit problems. Cognitive Systems Research, 12(2), pp. 164-174, 2011.
A. Niculescu-Mizil. Multi-armed bandits with betting-on-line learning with limited feedback. In Conference on Learning Theory, Montreal, 2009.
N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2011—abstract.
N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2011—graphic.
Heuer, R. J. (1999). Psychology of intelligence analysis. Center for the Study of Intelligence, CIA, Chapter 9.
Heuer, R. J. (1999) Psychology of intelligence analysis. Center for the Study of Intelligence, CIA, Chapter 10.
Heuer, R. J. (1999). Psychology of intelligence analysis. Center for the Study of Intelligence, CIA, Chapter 11.
Heuer, R. J. (1999). Psychology of intelligence analysis. Center for the Study of Intelligence, CIA, Chapter 12.
9E. Heuer, R. J. (1999). Psychology of intelligence analysis. Center for the Study of Intelligence, CIA, Chaper 13.
Roger Ratcliff, Daniel Spieler, and Gail Mckoon, Explicitly modeling the effects of aging on response time. Psychonomic Bulletin & Review, 7(1), pp. 1-25, 2000.
Peter H Rudebeck, Mark E Walton, Angharad N Smyth, David M Bannerman, and Matthew FS Rushworth. Separate neural pathways process different decision costs. Nature neuroscience, 9(9), pp. 1161-1168, 2006.
MFS Rushworth, TEJ Behrens, PH Rudebeck, and ME Walton. Contrasting roles for cingulate and orbitofrontal cortex in decisions and social behaviour. Trends in cognitive sciences, 11(4), pp. 168-176, 2007.
Russell, S. and Norvig, P. (2003). "Artificial Intelligence: A modern approach." Upper Saddle River: Prentice-Hall, Chapter 21.
Andrew Zaldivar, Derrik E Asher, and Jeffrey L Krichmar. Simulation of how neuromodulation influences cooperative behavior. In From Animals to Animats 11, pp. 649-660. Springer, 2010.
Lebiere, C., Pirolli, P., Thomson, R., Paik J., Rutledge-Taylor, M., Staszewski, J. & Anderson, J. R. "A functional model of sensemaking in a neurocognitive architecture". Computational intelligence and neuroscience 2013, 5, pp. 1-29.
Randy L Haupt and Sue Ellen Haupt. Practical genetic algorithms. John Wiley & Sons, 2004, Chapter 2.
Notice of Allowance for U.S. Appl. No. 14/334,649 dated Nov. 17, 2016.
A Neural Network Based System for Intrusion Detection and Classification of Attacks, by MORADI, 2004, pp. 148-04 1-6.
Training a Neural-Network Based Intrusion Detector to Recognize Novel Attacks, by Lee, 2001, pp. 294-299.
Intrusion detection using hierarchical neural networks, by Zhang, 2004, pp. 779-791.
Decisions, Decisions, Decisions. Choosing a Biological Science of Choice, by Glimcher, 2002, pp. 1-35.

\* cited by examiner

| Chosen Strategy | Outcome | Adjustment | Effect of Adjustment |
|---|---|---|---|
| PM+ | Correct | • Increase weight from ACC Conflict to PM+ in OFC, etc. by reward prediction error (Reward-VTA) *times learning rate*.<br>• Cost prediction error (Cost-RN) *times learning rate times loss sensitivity* moves weights from ACC Conflict to PM+ in ACC, etc. in the opposite direction. | • If PM+ was more rewarding and/or less costly than expected then it will becomes more likely to be chosen in subsequent trials.<br>• PM+ was a better choice than PM-. |
| | Error | • Decrease weight from ACC Conflict to PM+ in OFC, etc. by reward prediction error *times learning rate*.<br>• Increase weight from ACC Conflict to PM+ in ACC, etc. by cost prediction error (Cost-RN) *times learning rate times loss sensitivity*. | • If PM+ was less rewarding and/or more costly than expected than it will becomes less likely to be chosen in subsequent trials.<br>• PM- would have been a better choice than PM+. |

FIG. 6

METHOD AND APPARATUS FOR MODELING PROBABILITY MATCHING AND LOSS SENSITIVITY AMONG HUMAN SUBJECTS IN A RESOURCE ALLOCATION TASK

CROSS-REFERENCE TO RELATED APPLICATIONS

This is a Continuation-in-Part Application of U.S. Non-Provisional application Ser. No. 14/334,649, filed Jul. 17, 2014, entitled, "Method and Apparatus for an Action Selection System Based on a Combination of Neuromodulatory and Prefrontal Cortex Area Models," which is a Non-Provisional patent application of U.S. Provisional Application No. 61/885,641, filed in the United States on Oct. 2, 2013, entitled, "Method and Apparatus for an Action Selection System Based on a Combination of Neuromodulatory and Prefrontal Cortex Area Models," the entirety of which are hereby incorporated by reference as though fully set forth herein.

This is ALSO a Non-Provisional Application of U.S. Provisional Patent Application No. 61/982,696, filed Apr. 22, 2014, entitled, "Method and Apparatus for Modeling Probability Matching and Loss Sensitivity Among Human Subjects in a Resource Allocation Task," the entirety of which is hereby incorporated by reference as though fully set forth herein.

GOVERNMENT LICENSE RIGHTS

This invention was made with government support under U.S. Government Contract Number D10PC20021 ICArUS-MINDS. The government has certain rights in the invention.

BACKGROUND OF INVENTION

(1) Field of Invention

The present invention relates to a system for modeling probability matching and loss sensitivity among human subjects and, more particularly, to a system for modeling probability matching and loss sensitivity among human subjects in a resource allocation task.

(2) Description of Related Art

Probability matching is the bias of selecting options at frequencies that are proportional to base rates. Probability matching has been studied in binary assignment tasks such as the n-armed bandit (see the List of Incorporated Literature References, Literature Reference Nos. 3 and 7). Modeling probability matching and loss sensitivity (another bias) among human subjects can be used to create an explanatory and predictive model of human behavior. Such a method can then be used as a training tool, such as to derive a person's bias towards probability matching and loss sensitivity and then provide interventions against those biases.

Prior work related to modeling probability matching and loss sensitivity is primarily rooted in behavior. For instance, the work of Lee et al. (see Literature Reference No. 7) proposed a 'tau-switch' model in which subjects explore until they reach a certain number of trials tau, after which they exploit the option which yields the highest expected rewards. The 'tau switch' model is compared to other strategies for choices to explore or exploit on a given trial, including memoryless win-stay-lose-switch and variations on choosing to exploit with a certain probability, known as epsilon greedy algorithms (see Literature Reference No. 14). In an earlier work by Erev and Baron (see Literature Reference No. 3), various reinforcement learning strategies had been weighted and coefficients chosen via regression to best match subject behavior. They use reinforcement learning models adapted from Literature Reference No. 14.

Here, biological constraints inform model capabilities and, hence, have the potential of providing more detailed explanations and predictions of behavior. Thus, a continuing need exists for a system that is rooted in behavior and biology to handle more complex resource allocation tasks.

SUMMARY OF THE INVENTION

The present invention relates to a system for modeling probability matching and loss sensitivity among human subjects and, more particularly, to a system for modeling probability matching and loss sensitivity among human subjects in a resource allocation task. The system comprises one or more processors and a memory having instructions such that when the instructions are executed, the one or more processors perform multiple operations. A set of features related to probability matching and loss sensitivity are extracted from collected human responses. The set of features from the collected human responses are processed with a genetic algorithm to fit the collected human responses with a set of neural network model instances. A set of model parameters from the genetic algorithm are generated and used to generate a model of human behavior, the model being at least one of an explanatory and predictive model of human behavior.

In another aspect, the model parameters are selected from a group consisting of: bias to an aggressive strategy, loss sensitivity, and learning rate.

In another aspect, a level of aggressiveness in the collected human responses on a trial is quantified according to the following:

$$IG_t = h_{probabilities,t} - h_{resource\ allocations,t},$$

where $IG_t$ is the information gain on a trial t and $h_{x,t}$ is the entropy of probability distribution x on a trial t, wherein the quantity can be averaged across all trials to derive a measure of average aggressiveness for a subject according to the following:

$$\overline{A}_{all\ trials} = \frac{1}{10} \sum_{t=1}^{t=10} H(IG_t),$$

where H represents a Heaviside step function.

In another aspect, a sensitivity to loss in the collected human responses is quantified by averaging a number of aggressive trials on an error trial ($\overline{A}_{on\ error}$) and after an error trial ($\overline{A}_{after\ error}$), and using the difference between the averages to identify the presence of loss sensitivity (LS) according to the following:

$$\overline{A}_{on\ error} = \frac{1}{\|e\|} \sum_{e} H(IG_e),$$

$$\overline{A}_{after\ error} = \frac{1}{\|e\|} \sum_{e+1} H(IG_{e+1}),$$

$$LS = H(\overline{A}_{on\ error} - \overline{A}_{after\ error})$$

where e is an index of an error trial, (e+1) is an index of an after error trial, and $\|e\|$ is a total number of error trials for a given human subject.

In another aspect, the set of neural model instances are derived from a neural model which captures interactions between neuromodulators and prefrontal cortex for decision making.

In another aspect, based on the model, the system assigns a personality profile to a human subject whose responses were used to generate the model.

In another aspect, using the model, the system generates a predicted response of a human subject to an event.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table illustrating model dynamics according to the principles of the present invention;

DETAILED DESCRIPTION

Figure 1:
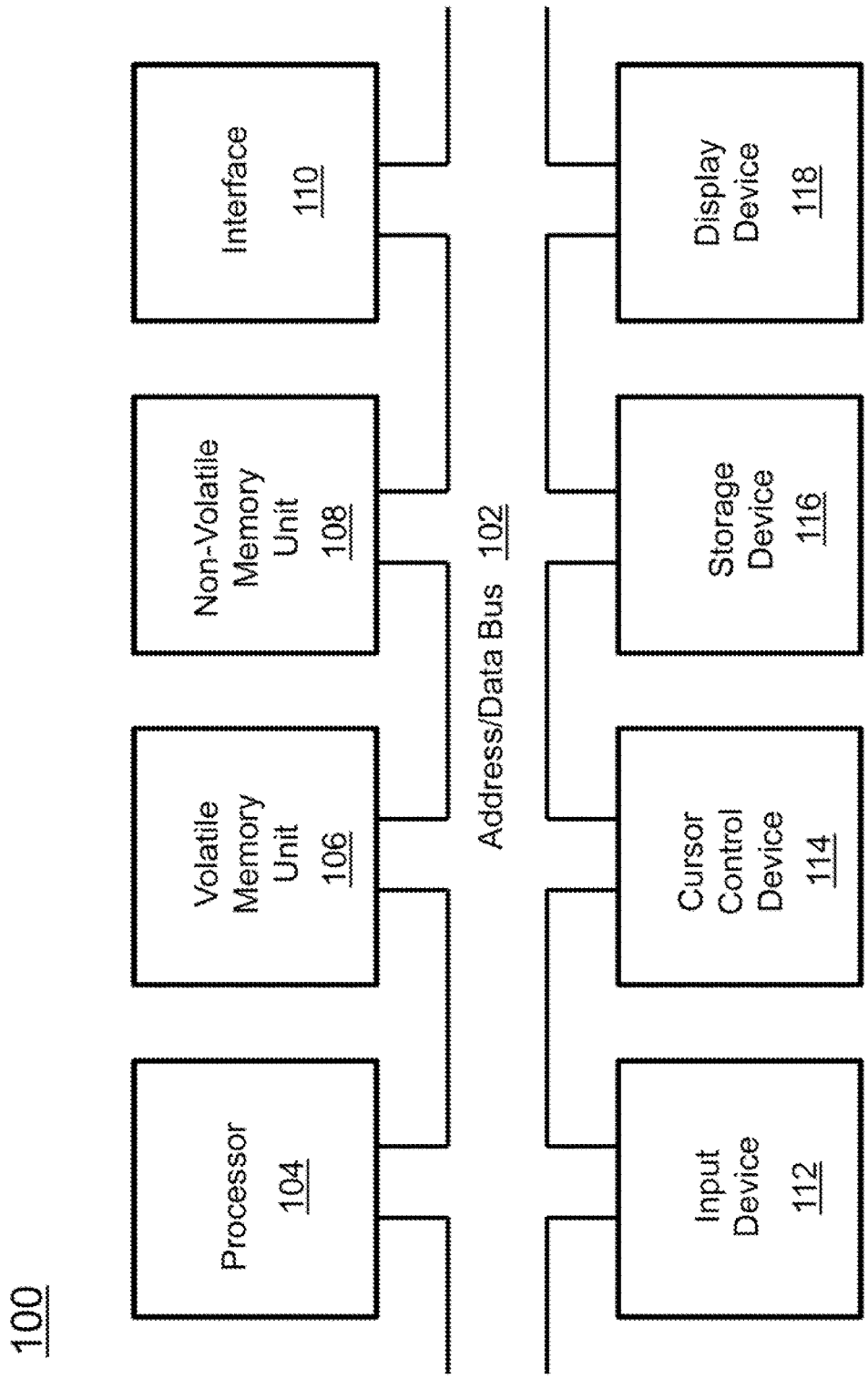
FIG. 1 is a block diagram depicting the components of a system for modeling probability matching and loss sensitivity among human subjects according to the principles of the present invention.

The present invention relates to a system for modeling probability matching and loss sensitivity among human subjects and, more particularly, to a system for modeling probability matching and loss sensitivity among human subjects in a resource allocation task. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Charles S Carver and Teri L White. Behavioral inhibition, behavioral activation, and affective responses to impending reward and punishment: The BIS/BAS scales. Journal of personality and social psychology, 67(2):319, 1994.

2. Suhas E Chelian, Nicholas Oros, Andrew Zaldivar, Jeffrey L Krichmar, and Rajan Bhattacharyya. Model of the interactions between neuromodulators and prefrontal cortex during a resource allocation task. In Development and Learning and Epigenetic Robotics (ICDL), 2012 IEEE International Conference on, pages 1-6. IEEE, 2012.
3. Ido Erev and Greg Barron. On adaptation, maximization, and reinforcement learning among cognitive strategies. Psychological review, 112(4):912, 2005.
4. Randy L Haupt and Sue Ellen Haupt. Practical genetic algorithms. John Wiley & Sons, 2004, Chapters
5. Daniel Kahneman and Amos Tversky. Choices, values, and frames. American psychologist, 39(4):341, 1984.
6. Donald Laming. Choice reaction performance following an error. Acta Psychologica, 43(3):199-224, 1979.
7. Michael D Lee, Shunan Zhang, Miles Munro, and Mark Steyvers. Psychological models of human and optimal performance in bandit problems. Cognitive Systems Research, 12(2): 164-174, 2011.
8. A. Niculescu-Mizil. Multi-armed bandits with betting—on-line learning with limited feedback. In Conference on Learning Theory, Montreal, 2009.
9. N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2011.
10. Rudiger Pohl, editor. Cognitive illusions: A handbook on fallacies and biases in thinking, judgement and memory. Psychology Press, 2004.
11. Roger Ratcliff, Daniel Spieler, and Gail Mckoon. Explicitly modeling the effects of aging on response time. Psychonomic Bulletin & Review, 7(1):1-25, 2000.
12. Peter H Rudebeck, Mark E Walton, Angharad N Smyth, David M Bannerman, and Matthew F S Rushworth. Separate neural pathways process different decision costs. Nature neuroscience, 9(9):1161-1168, 2006.
13. M F S Rushworth, T E J Behrens, P H Rudebeck, and ME Walton. Contrasting roles for cingulate and orbitofrontal cortex in decisions and social behaviour. Trends in cognitive sciences, 11(4):168-176, 2007.
14. Richard S Sutton and Andrew G Barto. Reinforcement learning: An introduction, volume 1. Cambridge Univ Press, 1998.
15. Andrew Zaldivar, Derrik E Asher, and Jeffrey L Krichmar. Simulation of how neuromodulation influences cooperative behavior. In From Animals to Animats 11, pages 649-660. Springer, 2010.
16. A. Bechara, A., Damásio, H. Damásio, S. Anderson, "Insensitivity to future consequences following damage to human prefrontal cortex," Cognition, vol. 50, no. 1-3, pp. 7-15, April-June 1994.
17. Lebiere, C., Pirolli, P., Thomson, R., Paik, J., Rutledge-Taylor, M., Staszewski, J. & Anderson, J. R. "A functional model of sensemaking in a neurocognitive architecture", Computational intelligence and neuroscience 2013, 5.

(2) PRINCIPAL ASPECTS

The present invention has three "principal" aspects. The first is a system for modeling probability matching and loss sensitivity among human subjects. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
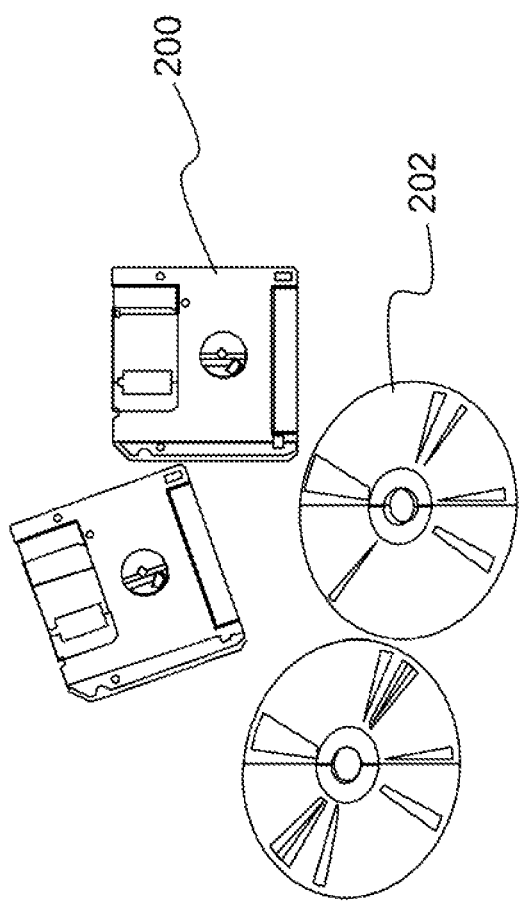
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Cognitive biases are ubiquitous (see Literature Reference No. 10 for a review of cognitive biases). Probability matching, for example, is the bias of selecting options at frequencies that are proportional to base rates. The Bayesian optimal strategy, however, is to always select the most likely outcome. As an example, if asked to repeatedly predict the outcome of a tail-heavy coin, humans often alternate between the heads and tails while the rational decision would be to always predict tails.

Probability matching has been studied in binary assignment tasks, such as the n-armed bandit (see Literature Reference Nos. 3 and 7). In the present invention, however, biases in an analog resource allocation task are studied based on a variant of the n-armed bandit task adapted to military planning. Analog resource allocation tasks are present in a variety of domains (e.g., divided attention, financial portfolios, network bandwidth allocation) and remain a ripe area of psychological study.

Analyzing behavioral data collected from MITRE, degrees of probability matching and loss sensitivity across human subjects were found. While there have been several theories on how probability matching arises, loss aversion (or greater sensitivity to loss than gain as described in Literature Reference No. 5) has been offered as one explanation (as described in Literature Reference No. 3). The system according to the principles of the present invention simulates varying degrees of probability matching and loss sensitivity biases in human subjects using a recent model which simulates interactions between neuromodulatory and prefrontal areas (the model is described in Literature Reference No. 2 and of U.S. Non-Provisional application Ser. No. 14/334,649, which are hereby incorporated by reference as though fully set forth herein). Unlike abstract models, such as those described in Literature References No. 3 and 7, the model described in Literature Reference No. 2 offers the advantage of directly relating neurobiology to behavior.

(4) SPECIFIC DETAILS OF THE INVENTION

The system described herein uses a combination of a behavioral task, feature extraction from human responses, a genetic algorithm optimization procedure, and neural network model instances to simulate varying degrees of probability matching and loss sensitivity. These modules are described in sections 4.1, 4.1.1 and 4.1.2, 4.2.4, and sections 4.2.1 to 4.2.3, respectively.

Figure 3:
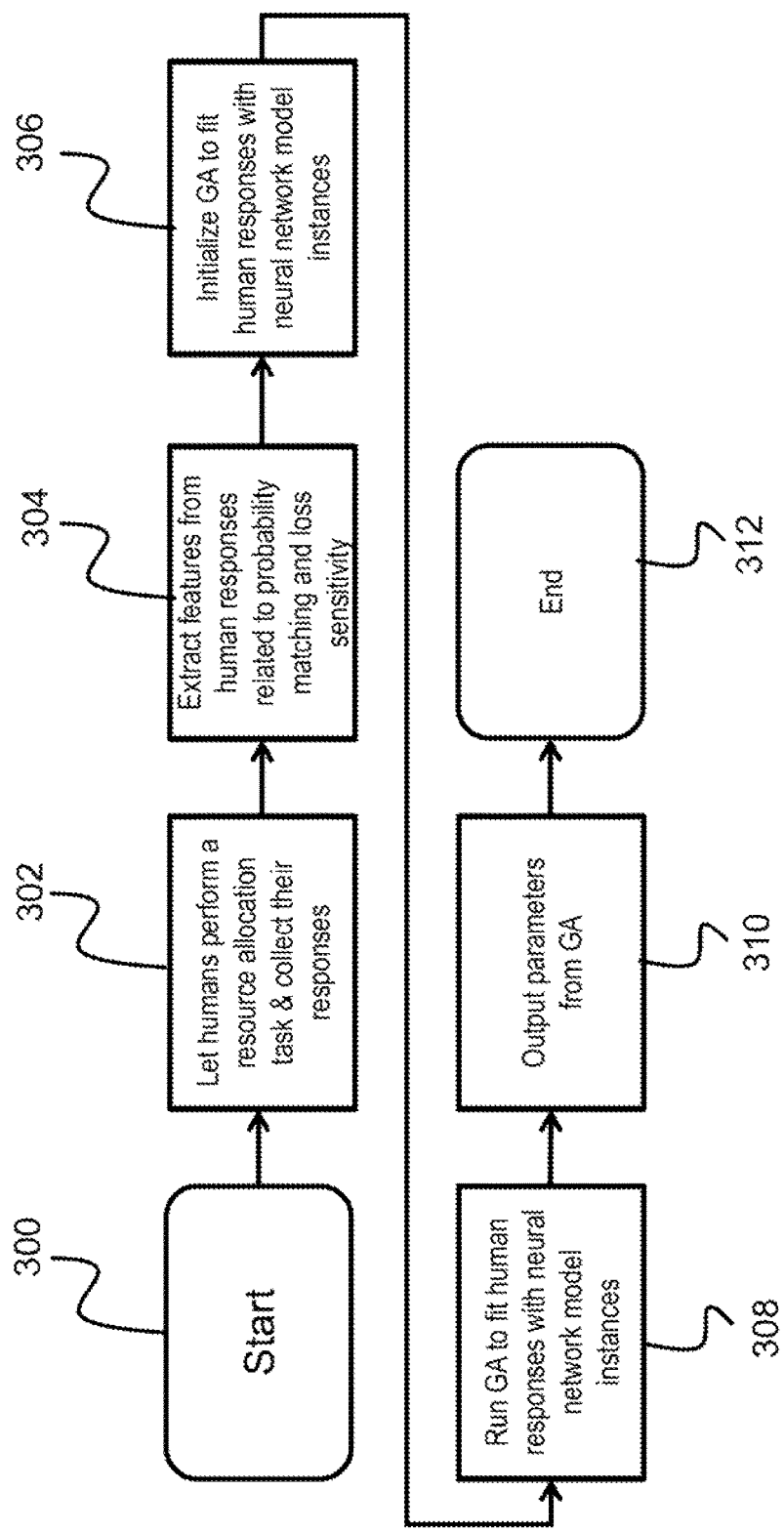
FIG. 3 is a flow diagram depicting a system for modeling probability matching and loss sensitivity among human subjects according to the principles of the present invention.

FIG. 3 illustrates a system block diagram which describes how the different modules interact to model probability matching and loss sensitivity among human subjects in a resource allocation task. After a "start" module 300, humans perform a resource allocation task and their responses are collected in a first module 302. Here, responses include hypotheses of what options are the most utile and actual resource allocations. Features related to probability matching and loss sensitivity (such as level of aggressiveness and sensitivity to loss, as described in section 4.1) are extracted from the human responses in a second module 304. Probability matching is derived from a measure of the amount of "sharpening" a subject performs between hypotheses of what options are the most utile and actual resource allocations; loss sensitivity is derived by the change in the amount of "sharpening" a subject performs on and after error trials ("sharpening" is more formally defined below). Then, a genetic algorithm (GA) is initialized to fit the human responses with neural network model instances in a third module 306. In a fourth module 308, the genetic algorithm initialized in the third module 306 is run. A set of parameters from the genetic algorithm are output in a fifth module 310 followed by an "end" module 312. Each of these modules/operations will be described in further detail below.

Derived model parameters (from the fifth module 310) can be used to create an explanatory and predictive model of human behavior. Such a method can then be used as a training tool, such as to derive a person's bias towards probability matching and irrational loss sensitivity and then provide interventions against those biases. As a non-limiting example, consider probability matching when a subject is asked to repeatedly bet on a coin that they know to be biased (e.g., 70% heads, 30% tails). If the subject alternates their bets (e.g., heads, heads, tails) they exhibit probability matching. This behavior can be measured and the normative solution with rationale can be described to the subject to prevent further probability matching in this and related problems. The rationale could depend on the inferred model parameters. For example, if high loss sensitivity is the primary cause for the probability matching then the description of normative reward functions could be described; on the other hand, if low learning rate and an initial bias towards more conservative behavior is the primary issue, a discussion on initial behavioral preferences could be presented. Yet another example is when a subject repeatedly picks cards from the four decks in the Iowa Gambling Task (see Literature Reference No. 16 for a description of the Iowa Gambling Task). If the subject picks cards from either of the two "bad" decks (the decks with smaller or consistently negative payoffs), they exhibit probability matching. Again, this behavior can be measured and intervened through instruction.

Yet another example is if a subject is asked to choose which TV show should carry an ad for one's product—e.g., should TV show 1 carry 100% of the ads or should the ads be evenly distributed among 3 different show? If the subjects have knowledge that all TV shows draw from the same pool of viewers and TV show 1 has the most viewers yet places ads on TV show 2 or 3, they exhibit probability matching. Any problem which can be mapped onto the n-arm bandit task with betting that humans perform (e.g., financial portfolio management, assigning patients to clinical trials, etc.) can be addressed by this framework.

(4.1) Analysis of Behavioral Data

During analysis, human subjects played a variant of the multi-arm bandit game with betting (as described in Literature Reference No. 8) adapted to a resource allocation task (i.e., module 302). The task simulates a military planner's decisions to defend against an attack. Specifically, given attack probability estimates for four groups, subjects must assign troops to defend against these groups. Thus, each trial "bets" troop units across four bandit arms. Subjects were scored on the number of troops they assigned to the true attacking group, troops assigned to other groups were said to be lost. Seventy-nine subjects played 10 trials.

Intuitively, one would assign more troops to groups that are more likely to attack. This is known as probability matching. For example, if the subject believes groups A, B, C, and D are likely to attack with probabilities of 80%, 10%, 5%, and 5% respectively, probability matching (PM) would assign 100 troops in the following manner: 80 to group A, 10 to group B, and 5 to both group C and D (assuming the marginal utility of each troop unit is constant). A more aggressive strategy, referred to as PM+, would assign more resources to groups which are more likely to attack (e.g., a troop allocation of 90, 10, 0, and 0 given the previous group attack probability estimates). Conversely, a more conservative strategy, referred to as PM−, would reserve troops (or resources) to groups which are less likely to attack (e.g., a troop allocation of 70, 14, 8, 8 for the same group attack probability estimates). Note that the PM+ (or PM−) strategy "sharpens" (or "flattens") the probability density function between group attack probability estimates and resource allocations. After assigning resources to the four groups, subjects were directly rewarded by the number of troops they assigned to the actual attack perpetrator. For example, if group A was the true attacker, than PM+ (or PM−) would be rewarded with a score of 90 (or 70). The cost would be the number of troops allocated to groups other than A, which are lost: 10 for PM+, and 30 for PM− (14+8+8). However, if group B was the attacker, the reward of PM− exceeds that of PM+ (14>10).

Subjects were separated into level of aggressiveness: the amount of sharpening they were performing; and sensitivity to loss: the change in the amount of sharpening after an error trial. The rational decision is to be fully aggressive and perform a winner-take-all resource allocation and, thus, avoid the probability matching bias. As resource allocations deviate from this (i.e., become less aggressive), subjects probability match to a greater degree.

Figure 4:
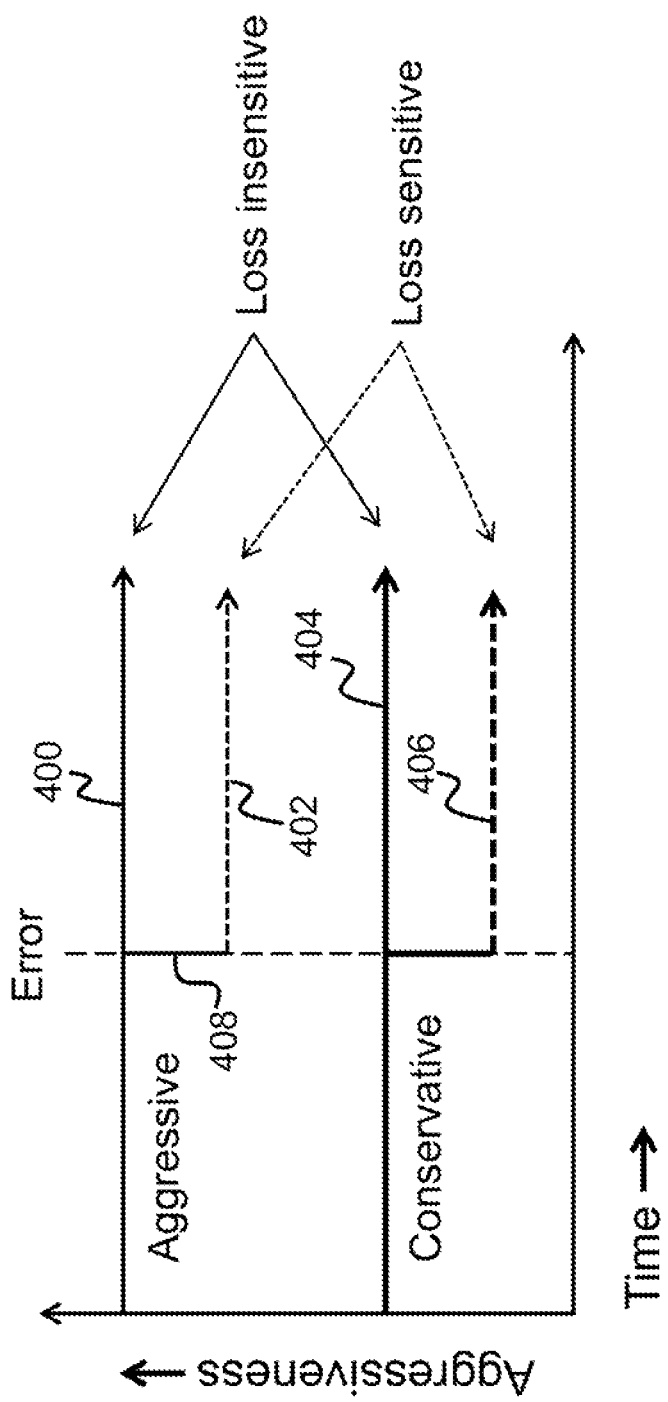
FIG. 4 is an illustration of levels of aggressiveness and loss sensitivity according to the principles of the present invention.

FIG. 4 illustrates the four behavioral phenotypes: high aggressiveness loss insensitive (HI), high aggressiveness loss sensitive (HS), low aggressiveness loss insensitive (LI), and low aggressiveness loss sensitive (LS). The phenotypes are defined by baseline aggressiveness, which can be either low or high (i.e., conservative or aggressive), and change in behavior (or lack thereof) after a loss, which can be characterized as either loss sensitive or loss insensitive. Aggressive subjects (represented by unbolded lines 400 and 402) have a higher baseline level of aggressiveness than conservative subjects (represented by bolded lines 404 and 406). After an error (i.e., incorrectly predicting the true attacker) represented by the vertical line 408, loss sensitive subjects (dashed lines 402 and 406) would become more conservative than loss insensitive subjects (solid lines 400 and 404). A loss insensitive subject may also increase their level of aggressiveness.

The aggressive (or conservative) insensitive subjects have a high (or low) baseline level of aggressiveness, and this value does not change significantly after a loss. Conversely, aggressive (or conservative) sensitive subjects have a high (or low) baseline aggressiveness, and after a loss this value becomes lower. The phenotypes also connect to common findings in the literature as follows. The Laming effect (which is described in Literature Reference No. 6) recognizes a characteristic slowing after errors in judgment and recognition. Slowing down and re-considering or initializing preferences upon presentation of the next task is a more conservative behavior and is generally represented in the literature by changes in model parameters, such as the threshold in a drift diffusion model (see Literature Reference No. 11).

To quantify the level of aggressiveness which corresponds to less probability matching, the information gain for a given subject in trial t ($IG_T$) between probabilities and resource allocations was first measured according to the following:

$$IG_t = h_{probabilities,t} - h_{resource\ allocations,t}$$

where $h_{x,t}$ is the entropy of probability distribution x (i.e., probabilities or resource allocations) on trial t (resource allocations across all groups were all greater than or equal to 0 and summed to 100% thus satisfying the conditions of a probability distribution). Positive (or zero, or negative) information gain corresponds to sharpening (or not changing, or flattening) probabilities into resource allocations or PM+ (or PM, or PM−). Table 1 provides non-limiting examples of trial classifications.

TABLE I

Illustration of information gain from probabilities to resource allocations and trial classifications.

| Trial | Probabilities | Resource Allocation | Information Gain | Trial Classification |
|---|---|---|---|---|
| a | 80, 10, 5, 5 | 90, 10, 0, 0 | .5529 bits, >0 | PM+ => Aggressive |
| b | 80, 10, 5, 5 | 80, 10, 5, 5 | 0 bits, 0 | PM => Conservative |
| c | 80, 10, 5, 5 | 70, 14, 8, 8 | −0.3184 bits, <0 | PM− => Conservative |

In Table 1, trial a (or b, or c) would be considered a PM+ (or PM, or PM−) action. Since the optimal strategy is to sharpen into a winner-take-all allocation, PM+ trials are labeled as Aggressive and group PM and PM− trials are labeled as Conservative. The number of Aggressive trials were then averaged for a given subject according to the following:

$$\bar{A}_{all\ trials} = \frac{1}{10} \sum_{t=1}^{t=10} H(IG_t),$$

where H is the Heaviside step function, or unit step function. The Heaviside step function is a discontinuous function whose value is zero for negative argument and one for positive argument. An Aggressive (or Conservative) trial has positive (or no or negative) information gain so H ($IG_t$) is 1 (or 0). A subject who would always respond aggressively (or conservatively) would have an $\bar{A}_{all\ trials}$ as 100% (or 0%); a mixture of Aggressive and Conservative trials would have an $\bar{A}_{all\ trials}$ between 0% and 100%.

To quantify the sensitivity to loss, an error trial was defined as any trial in which fewer than 25 troops were assigned to the true attacker (25 troops could be gained by chance). Then, both the number of Aggressive trials on an error ($\bar{A}_{on\ error}$) and after an error ($\bar{A}_{after\ error}$) were averaged. The difference between the two averages was used to identify the presence of loss sensitivity (LS) according to the following:

$$\bar{A}_{on\ error} = \frac{1}{\|e\|} \sum_e H(IG_e),$$

$$\bar{A}_{after\ error} = \frac{1}{\|e\|} \sum_{e+1} H(IG_{e+1}),$$

$$LS = H(\bar{A}_{on\ error} - \bar{A}_{after\ error}),$$

where e (or e+1) is the index of an error (or after error) trial, and $\|e\|$ is the total number of error trials for a given subject. Because there is no trial after the last trial, if trial 10 was an error there would be no corresponding after error trial to compare to so those trials were excluded from the equations above. If the average number of aggressive trials after an error is less than the average number of aggressive trials on an error ($\bar{A}_{after\ error} < \bar{A}_{on\ error}$), loss sensitivity would be present (LS=1). Thus, a loss sensitive subject becomes more conservative (or less aggressive) after an error. Conversely, if the average number of aggressive trials after an error is greater than or equal to the average number of aggressive trials on an error ($\bar{A}_{after\ error} \geq \bar{A}_{on\ error}$), loss sensitivity would not be present (LS=0). Thus, a loss insensitive subject becomes more aggressive or maintains the same level of aggressiveness after an error. Table 2 below illustrates a calculation with an error trial and two possible after error trial responses. Trial 1 represents the on error trial, trial 2 represents one possible trial response, and trial 2' is a different trial response after trial 1.

TABLE 2

Illustration of loss sensitivity.

| Trial | Probabilities | Resource Allocation | Information Gain | Trial Classification | Loss Sensitivity |
|---|---|---|---|---|---|
| 1 | 80, 10, 5, 5 | 90, 10, 0, 0 | .5529 bits, >0 | PM+ => Aggressive | $\bar{A}_{on\ error}$ = 1 |
| 2 | 5, 10, 80, 5 | 8, 14, 70, 8 | 0 bits, 0 | PM => Conservative | $\bar{A}_{after\ error}$ = 0 LS = H(1 − 0) => Yes |
| 2' | | 0, 10, 90, 0 | .5529 bits, >0 | PM+ => Aggressive | $A_{after\ error}$ = 1 LS = H(1 − 1) => No |

Going from an aggressive to a conservative trial choice after an error (trials 1 and 2) is considered loss sensitive behavior, whereas maintaining (trials 1 and 2') or increasing the level of aggressiveness (not illustrated) is considered loss insensitive behavior. If the true attacker on trial 1 was any group besides group A (e.g., group C), this trial would be considered an error trial because less than 25 points were assigned to the true attacker. On the next trial, if the subject output resource allocations on row 2, the trial type would change from aggressive to conservative, indicating loss sensitivity. That is, the subject became more conservative with their resource allocations. However, if on the next trial, the subject output resource allocations on row 2', the trial type would remain aggressive, indicating a lack of loss sensitivity or loss insensitivity. Note that the next trial may or may not be an error trial. For example, if C (or D) was the true attacker both trials 2 and 2' would be considered a correct (or error) trial.

(4.1.1) Groups of Aggressiveness

After calculating the average number of aggressive trials for each subject ($\bar{A}_{all\ trials}$), the subjects were separated into two groups. The first group included those subjects whose average number of aggressive trials was higher than the average $\bar{A}_{all\ trials}$ across all subjects. The second group included those whose average number of aggressive trials was lower than or equal to the average $\bar{A}_{all\ trials}$ across all subjects. The first group has more aggressive trials and is, consequently, more aggressive. The second group has less than average or an average number of aggressive trials. These groups are referred to as high aggressiveness and low aggressiveness, respectively. Because the high (or low) aggressiveness group is closer to (or further from) the rational decision of a winner-take-all resource allocation, they are less (or more) subject to the probability matching bias.

(4.1.2) Subgroups for Loss Sensitivity/Insensitivity

The high aggressiveness and low aggressiveness groups were further separated into two smaller groups based on whether each subject was loss sensitive or not. The smaller groups were those with high aggressiveness and loss sensitivity, those with high aggressiveness and loss insensitivity, and similarly for the low aggressiveness group. Thus, loss sensitive group members were those subjects who became more conservative (e.g., from aggressive, PM+, to conservative, PM or PM−, as trials 1 and 2 illustrate in Table 2) after an error. The loss insensitive group were all subjects who increased or became more aggressive (e.g., from conservative, PM or PM−, to aggressive, PM+) or maintained the same level of aggressiveness (e.g., from conservative to conservative or aggressive to aggressive) after an error trial.

(4.2) Model Fits

Figure 5:
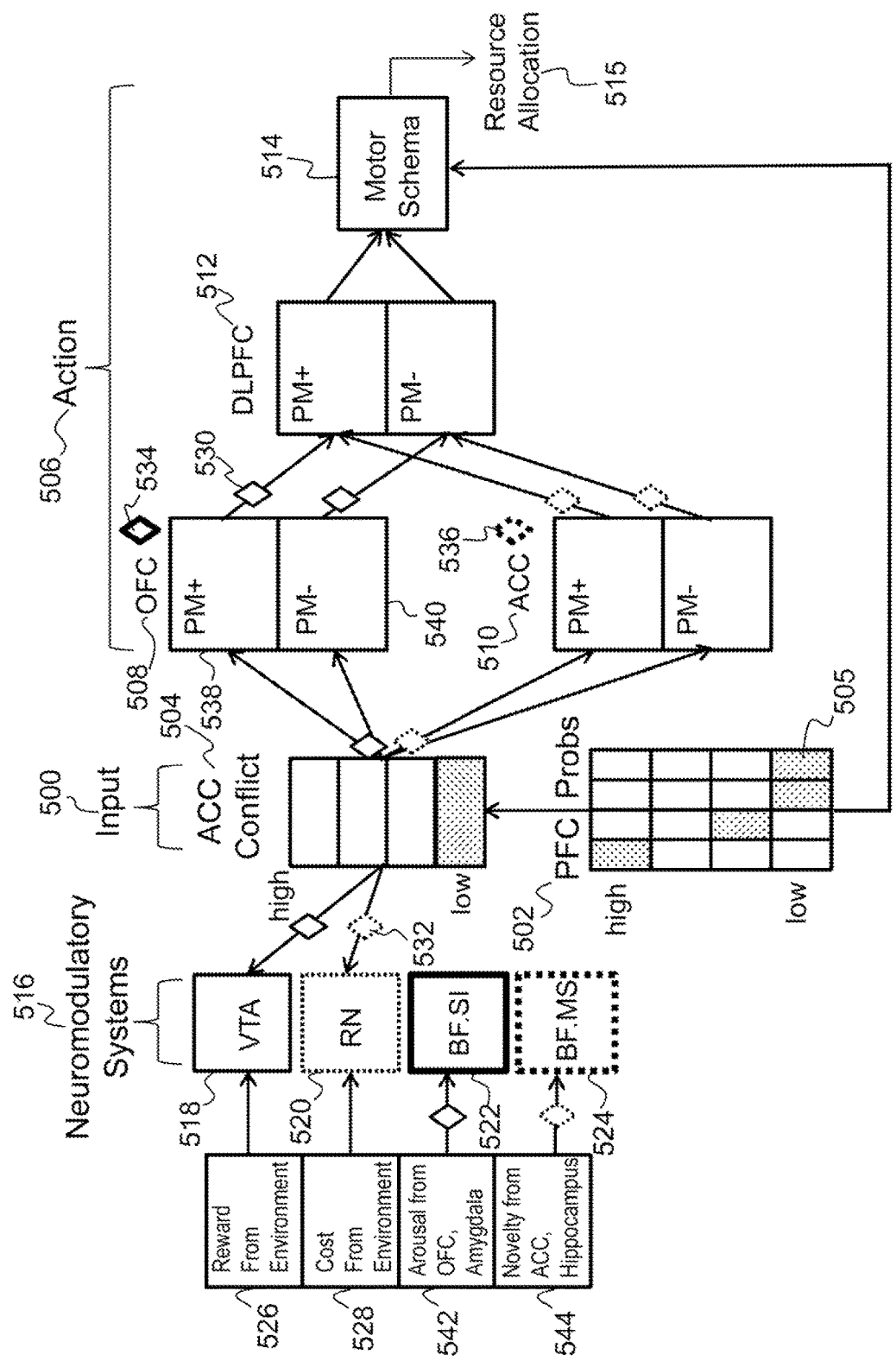
FIG. 5 is an illustration of a neural network model of the multi-arm bandit game with betting as depicted in U.S. patent application Ser. No. 14/334,649.

A recent neural network model of the multi-arm bandit game with betting, which is described in Literature Reference No. 2, was used to emulate the behavior of each human subject. This model is a neurally plausible temporal difference model which captures interactions between neuromodulators and prefrontal cortex for decision making. The model builds on the work of Krichmar et al. (see Literature Reference Nos. 9 and 15) and leverages recent findings that the orbitofrontal cortex (OFC) and the anterior cingulate cortex (ACC) are implicated in decision making (such as described in Literature Reference Nos. 12 and 13). FIG. 5 and Table 3 below detail the model.

FIG. 5 illustrates the recent neural network model of the multi-arm bandit game with betting described in Literature Reference No. 2 and U.S. Non-Provisional Application Ser. No. 14/334,649. This model is a neurally plausible temporal difference model which captures interactions between neuromodulators and the prefrontal cortex for decision making.

In an input area module 500, PFC Probs module 502 (prefrontal cortex probabilities) registers group attack probability estimates. A non-limiting example of such group attack probability estimates includes 80%, 10%, 5%, and 5%. An ACC Conflict module 504 (Anterior Cingulate Cortex Conflict) registers relatively low conflict for this example. Conflict refers to the competition between possible actions; low conflict refers to little competition (i.e., a winner is clear), and high conflict refers to high competition (i.e., a winner is not clear). For simplicity, these values are shown as binned activations in shaded regions 505. However, as can be appreciated by one skilled in the art, a number of encoding schemes are possible, such as thermometer codes.

In an action area module 506, the OFC module 508 neurons and ACC neurons 510, each with different degrees of aggressiveness, encode the different strategies. The OFC module 508 neurons and the ACC neurons 510 then project to the dorsolateral PFC (DLPFC) module 512, where a motor schema 514 takes a selected aggressiveness parameter and transforms PFC Probs module 502 into a resource allocation 515. A motor schema 514 is an input/output transformation described at a high level of detail. For this problem, each motor schema 514 takes as input the probabilities in PFC Probs module 502 and an aggressiveness parameter and outputs a resource allocation 515. A high setting of the aggressiveness parameter sharpens PFC Probs module 502 into a resource allocation 515, while a low setting flattens PFC Probs module 502 into a resource allocation 515. A non-limiting example of how PFC Probs module 502 are transformed into a resource allocation 515 is defined in U.S. Non-Provisional application Ser. No. 14/334,649.

In a neuromodulatory area module 516, the VTA module 518, the RN module 520, the BF .SI module 522, and the BF .MS module 524 represent reward 526, cost 528, and incremental 542 and decremental 544 attentional pathways in that order, respectively. The VTA module 518 is used to register the difference between actual and predicted reward 526, while the RN module 520 is used to register the difference between actual and predicted cost 528. Predicted reward 526 is encoded in weights between the ACC Conflict module 504 and the VTA module 518, while predicted cost 528 is encoded in weights between the ACC Conflict module 504 and the RN module 520. In the model, reward 526 was set as equal to the percentage of troops assigned to the attacking group, while cost 528 was set as equal to the percentage of troops used to defend against other groups. The neuromodulatory effects of the BF .SI module 522 and BF .MS 524 control sharpening and flattening dynamics in the OFC module neurons 508 and the ACC neurons 510, respectively. Diamonds represent corresponding neuromodulatory effects; therefore, unbolded solid line diamonds 530 represent dopaminergic neuromodulation from the VTA, unbolded dashed line diamonds 532 represent serotonergic neuromodulation from the RN 520, bold solid line diamonds 534 represent cholinergic neuromodulation from the BF .SI (which increments attention), and bold dashed line diamonds 536 represent cholinergic neuromodulation from the BF .MS (which decrements attention). For example, weights between the ACC Conflict module 504 and the OFC module 508 neurons used the dopamine signal from the VTA module 518, as indicated by the unbolded solid line diamond.

Neurons in the PFC region of the input area module 500 held group attack probabilities estimates (i.e., PFC Probs module 502), while neurons in the ACC region of the input area module 500 had a localist representation for the spread of these estimates (i.e., ACC Conflict module 504). For simplicity, a measure of dispersion on PFC Probs module 502 was programmatically calculated, and its value was placed into the ACC Conflict module 504. Spread or dispersion refers to the "peakiness" of a probability distribution. Peaky probability distributions have low spread, while flat probability distributions have high spread. The ACC has long been implicated with several performance monitoring functions, including measuring conflict between different actions or outcomes.

There are two possible strategies in the action area 506, one for PM+ 538 and one for PM− 540. PM+ refers to the strategy that is more aggressive than probability matching (PM), and PM− refers to the strategy that is less aggressive than probability matching. Each strategy has a corresponding OFC and ACC component (i.e., the OFC module 508 neurons and the ACC neurons 510), which then compete and project to a final decision layer in the DLPFC module 512, an area of the PFC known to be involved in executive control of actions. It is assumed that the OFC module 508 neurons project to the direct, or go, pathway, and the ACC neurons 510 project to the indirect, or no go, pathway, which aligns with the commonly known functional anatomy of the basal ganglia. The chosen strategy in the DLPFC module 512 takes group attack probability estimates and implements a motor schema 514 to sharpen or flatten this distribution in assigning resources. Sharpening (PM+) refers to making the resource allocation more peaky than the input probabilities while flattening (PM−) refers to making the resource allocation less peaky than the input probabilities.

Table 3 below is a table of synaptic connections between neural area modules of the neural model described above and in U.S. Non-Provisional application Ser. No. 14/334,649.

TABLE 3

Synaptic connections between neural areas.

| ROW | FROM | TO | PLASTICITY | PHASIC NEUROMODULATION |
|---|---|---|---|---|
| Input | | | | |
| 1 | ACC | OFC | Reward-VTA | N |
| 2 | Con- | ACC | Cost-RN | N |
| 3 | flict | VTA | Reward-VTA | N |
| 4 | | RN | Cost-RN | N |
| Action | | | | |
| 5 | OFC | DLPFC | Reward-VTA | N |
| 6 | | OFCC | N/A | Y, BF.SI sharpens |
| 7 | | BF.SI | Reward-VTA$^{STP}$ | N |
| 8 | ACC | DLPFC$^1$ | Cost-RN | N |
| 9 | | ACCC | N/A | Y, BF.MS flattens |
| 10 | | BF.MS | Cost-RN$^{STP}$ | N |

In the "To" column, a C represents lateral competition, while an I represents inhibition. In the "Plasticity" column, long-term plasticity is driven by reward (Reward-VTA) or cost (Cost-RN) prediction errors. Reward and cost are provided from the external environment. VTA (or RN) refers to the activity of the VTA (or RN) neuron. Short-term plasticity is present where STP appears. Plasticity refers to long-term increments or decrements in synaptic weights, and phasic neuromodulation refers to short-term increments or decrements of synaptic efficacy. For additional details regarding the neural model, refer to Literature Reference No. 2 and U.S. Non-Provisional application Ser. No. 14/334,649.

The dynamics of the neural model described above can be understood by considering a trial of the n-armed bandit task with betting. A trial consists of group attack probability estimates and their spread being registered in the input area module 500. Activation from the input area module 500 propagated into the action area module 506 and the neuromodulatory area module 516. In action area module 506, only two strategies were available PM+ and PM−, which correspond to sharpening and flattening probabilities into resource allocations, respectively. Again, since PM+ (or PM−) is closer to (or further from) the rational strategy of a winner-take-all allocation, it represents less (or more) probability matching. After a winning strategy, i.e., the strategy with the highest activation, was selected in the action area module 506, the model either sharpened (PM+) or flattened (PM−) its probabilities into resource allocations 515. The environment then provided reward equal to the number of troops assigned to the correct group and cost equal to the total of all troops assigned to other groups. This feedback in turn drove short- and long-term dynamics in the neuromodulatory area module 516: short-term plasticity and weight changes, respectively. The experiments of Chelian et al. (see Literature Reference No. 2) did not find that the use or disuse (lesioning) of the short term neuromodulatory dynamics lead to an overall change in the percentage of aggressive strategies used across several trials as they were designed to capture a short term explore/exploit dynamic. Thus, the focus is now on explaining learning through long-term dynamics.

If group attack probability estimates were accurate, reward from the environment would be higher for PM+ than for PM−. In this case, weights between ACC Conflict and the PM+ strategy in the OFC should increase due to higher than expected reward. Weights between ACC Conflict and VTA would also move in the same direction (Table 3, row 3). There would be the same trend for weights between PM+ in OFC and DLPFC (Table 3, row 5). Weights between ACC Conflict and the PM+ strategy in ACC (Table 3, row 2), ACC Conflict and RN (Table 3, row 4), and PM+ in ACC and DLPFC (Table 3, row 8) should decrease due to lower than expected cost (here, cost is complementary to reward). Thus, on correct trials, an aggressive strategy would increment its weights relative to a conservative one, making it more likely to be picked on the next trial. Conversely, on incorrect trials, an aggressive strategy would decrement its weights relative a conservative one making it less likely to be picked on the next trial.

(4.2.1) Model Parameters

To fit each subject's behavior, the neural model, described above and depicted in FIG. 5, was studied with three parameters: bias to PM+, loss sensitivity, and learning rate. Bias to PM+ refers to an initial weight to choose the PM+ strategy on the first trial. A value of 1 (or 0), for example, means PM+ certainly will (or will not) be chosen on the first trial. This is meant to capture an initial aggressiveness, or lack of probability matching, of a subject. Loss sensitivity refers to how responsive to losses the model is. A value equal to 1 means losses (i.e., troops assigned to the non-attacking group) are weighed equally with gains (i.e., troops assigned to the attacking group). If loss sensitivity is greater than (or less than or equal to) 1, losses seem larger than (or smaller than or equal to) gains and the model becomes loss sensitive (or insensitive). This is meant to model a subject's loss sensitivity where losses often loom larger than gains (see Literature Reference No. 5). Learning rate refers to a scaling factor on how much weights are updated for a given trial. A value of 1 (or 0) means a trial will cause significant (or no) learning. This is meant to model subject's adaptation across trials as some would adapt their choice of strategies after experiencing losses or gains while others would not. The table in FIG. 6 illustrates original model dynamics with parameter variations in italics if PM+ was chosen. If PM− was chosen and the predicted attacker matched the true attacker (i.e., if correct), weight updates will make it more likely to more chosen in later trials but the magnitudes of these updates would be less than if PM+ would have been chosen instead. Thus, over several trials the effect of these weight updates is to favor a PM+ (or PM−) schema when the model (see Literature Reference No. 2 for a description of the model) is mostly correct (or incorrect).

(4.2.2) Groups of Aggressiveness

With a high bias to PM+, models would produce an initial PM+ choice. However, this does not mean these model instances would remain aggressive unless their subsequent learning was minimal. This can be accomplished by (1) having the model experience mostly correct responses (in which case the model would become more aggressive) and/or (2) having a mix of correct and incorrect responses with low learning rate which retains the initial bias to PM+. Conversely, with a low bias to PM+, models would produce an initial PM− choice. However, this does not mean model instances (i.e., each copy of the neural network which may vary over parameters or initial weights) would remain conservative. This can be accomplished by having the model experience mostly incorrect responses (in which case the model would become more conservative) and/or having a low learning rate.

(4.2.3) Subgroups for Loss Sensitivity/Insensitivity

With a non-zero learning rate, losses (or gains) would cause both aggressive and conservative model instances to become more conservative (or aggressive). The loss sensitivity parameter heightens the effect of incorrect responses relative to correct ones, thus, driving the models to more conservative responses.

(4.2.4) Optimization

For the three parameters under consideration—bias to PM+, loss sensitivity, and learning rate—values were varied over the respective intervals [0,1], [0,2], and [0,5] in five equal steps. Probabilities from subject responses were fed into PFC Probs and activities were propagated through the ACC Conflict (input area of FIG. 5) until a strategy was chosen yielding a resource allocation. If PM+ (or PM−) was chosen, this trial had a positive (or negative) information gain, thus, making it an Aggressive (or Conservative) trial. The PM+ and PM− parameters from Chelian et al. (see Literature Reference No. 2) were used and there was no attempt to optimize these parameters for each subject. The same ground truth given to subjects was also given to model instances which then affected subsequent model decisions. Using a genetic algorithm (described in Literature Reference No. 4), the L2 norm was minimized between trial classifications for each subject ($H(IG_t)$) and model instance ($H(IG_t^m)$) and summed over all members in a group (subscript g which ranges over high aggressiveness loss sensitive, high aggressiveness loss insensitive, etc.):

$$Err_g = \sum_g \frac{1}{10} \sum_{t=1}^{t=10} (H(IG_t) - H(IG_t^m))^2.$$

The average parameter values that produced the least error for each group were also output for analysis (element 310).

In the system according to the principles of the present invention, a genetic algorithm (GA) is used to optimize parameters of the neural network. A GA is an optimization and search technique based on the principles of genetics and natural selection. A GA allows a population composed of many individuals to evolve under specified selection rules to a state that maximizes the "fitness" (i.e., minimizes the cost function) (see Literature Reference No. 4). Each genotype in the population encodes parameter values for a model instance corresponding to a human in a given group; as an example, one genotype might encode a bias to PM+ value of 0, a loss sensitivity value of 2, and a learning rate of 0. The evolution environment and GA operators select genotypes which encode parameter values which align model fits well to the responses of human subjects. As an example, using the genotype representing the bias to PM+ value of 0, a loss sensitivity value of 2 and a learning rate of 0 would produce a model instance which is conservative and not dynamic in its choices. The GA optimization may choose this genotype to fit a low aggressiveness, loss insensitive subject. For a description of genotype selection, refer to Literature Reference No. 4.

Figure 7:
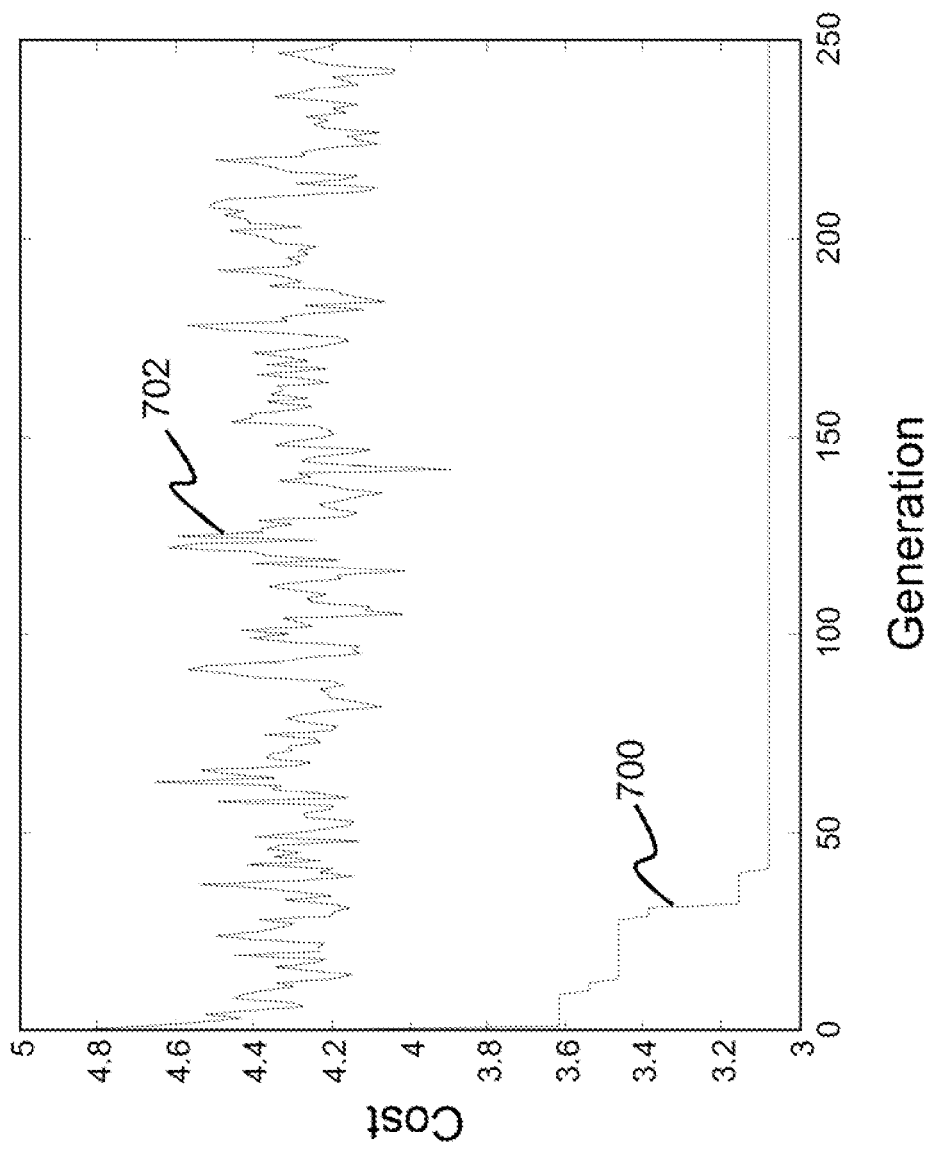
FIG. 7 is a representative fitness plot of the genetic algorithm fitting model parameters to human subject responses in a group according to the principles of the present invention.

FIG. 7 is a representative fitness plot of the genetic algorithm fitting model parameters to human subject responses in a group. The lower dashed line 700 represents the fitness of the combination of parameters across all model instances which provides the best solution. The upper solid line 702 represents the average fitness across all genotype instances.

(5) RESULTS (5.1) Analysis of Behavioral Data
(5.1.1) Groups of Aggressiveness

Figure 8:
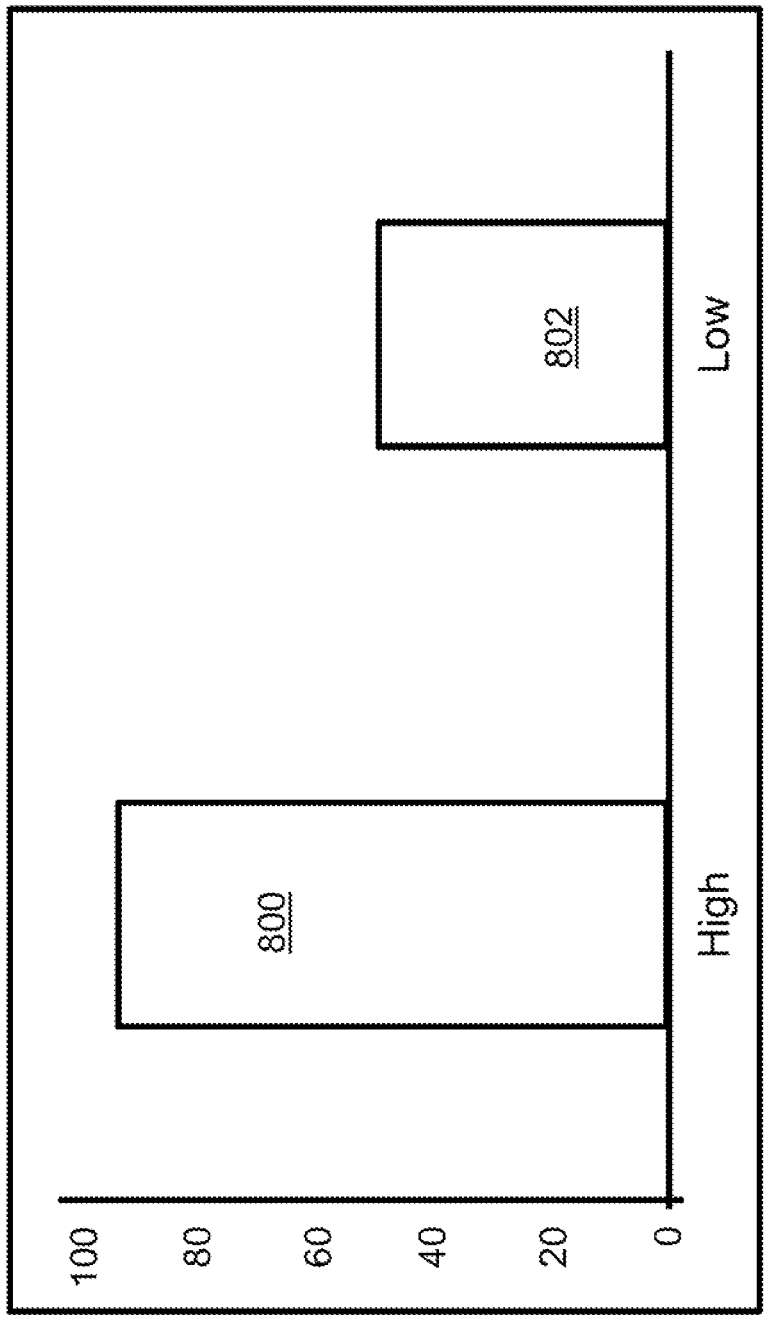
FIG. 8 is an illustration of groups of aggressiveness for human subjects according to the principles of the present invention.

FIG. 8 depicts the means for the two groups of aggressiveness in terms of $\overline{A}_{all\ trials}$ for human subjects. There are 53 high aggressiveness subjects (element 800) and 26 low aggressiveness (element 802) subjects. Aggressive subjects had a higher baseline aggressiveness across all trials than conservative subjects, thus less probability matching. The difference between the two groups is statistically significant (t-test, p<0.05).

(5.1.2) Subgroups for Loss Sensitivity/Insensitivity

Figure 9:
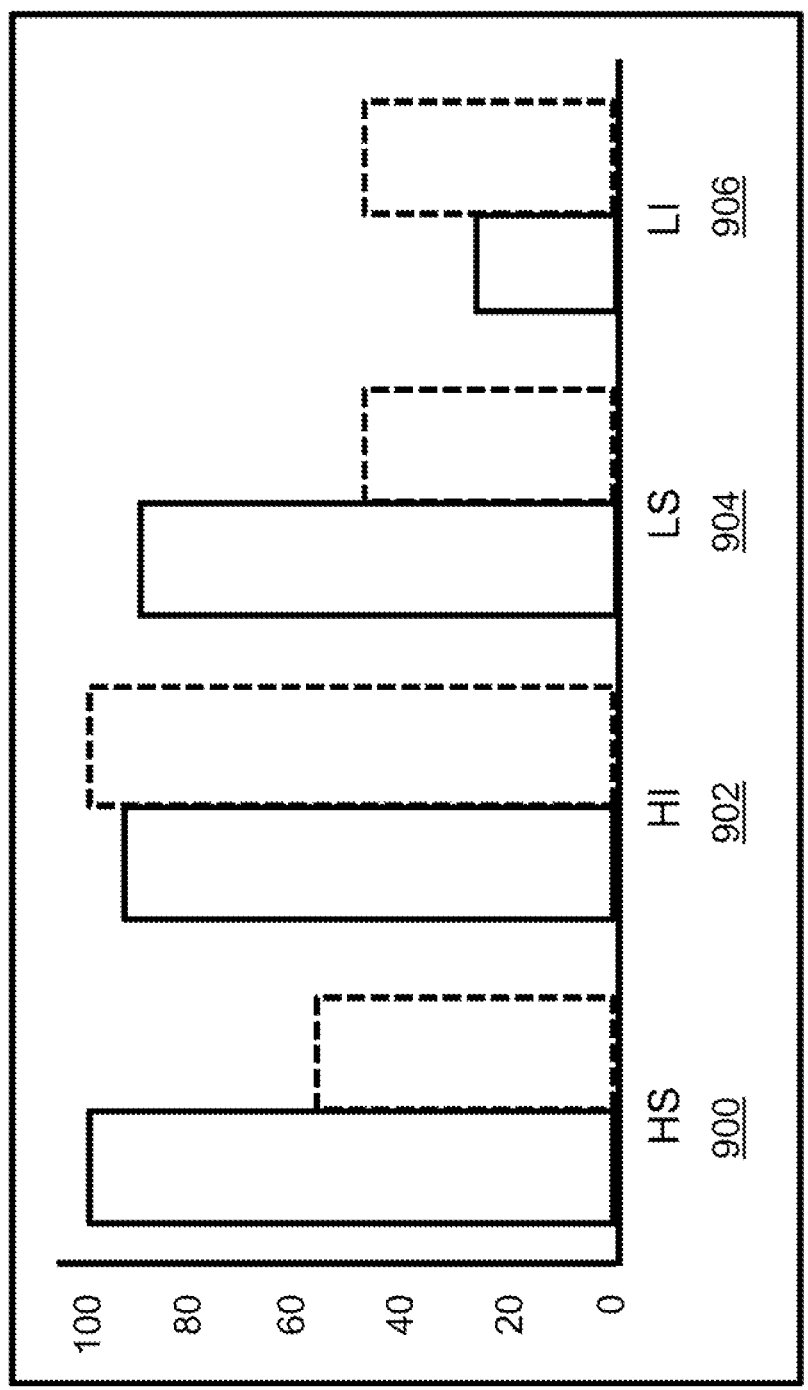
FIG. 9 illustrates on and after error aggressiveness for human subjects according to the principles of the present invention.

FIG. 9 illustrates loss sensitivity for high aggressiveness loss sensitive (HS) 900, high aggressiveness loss insensitive (HI) 902, low aggressiveness loss sensitive (LS) 904, and low aggressiveness loss insensitive subjects (LI) 906 by plotting $\overline{A}_{on\ error}$ (represented by solid line bars) and $\overline{A}_{after\ error}$ (represented by dashed line bars) for human subjects. Of the 53 high aggressiveness subjects, 12 were loss sensitive and 41 were not. Of the 26 low aggressiveness subjects, 13 were loss sensitive and 13 were not. Comparing aggressiveness on and after error trials for high loss sensitive subjects, it was seen that these subjects indeed become more conservative, decreasing their aggressiveness demonstrating loss sensitivity, as indicated by shorter dashed lines bars compared to the solid line bars in element 900. A similar trend holds for low aggressiveness loss sensitive subjects, as indicated by shorter dashed line bars compared to solid line bars in element 904. Looking at aggressiveness on and after error trials for high aggressiveness and low aggressiveness insensitive subjects, it was seen that these subjects appear to become more aggressive, as indicated by taller dashed line bars compared to solid line bars in elements 902 and 906. Significant differences were found in the sensitive groups (paired t-test, p<0.05), but not the insensitive groups (paired t-test, p>0.05). This suggests that loss sensitive (or loss insensitive) subjects did (or did not) significantly change their aggressiveness after error trials.

(5.2) Model Fits
(5.2.1) Groups of Aggressiveness

Figure 10:
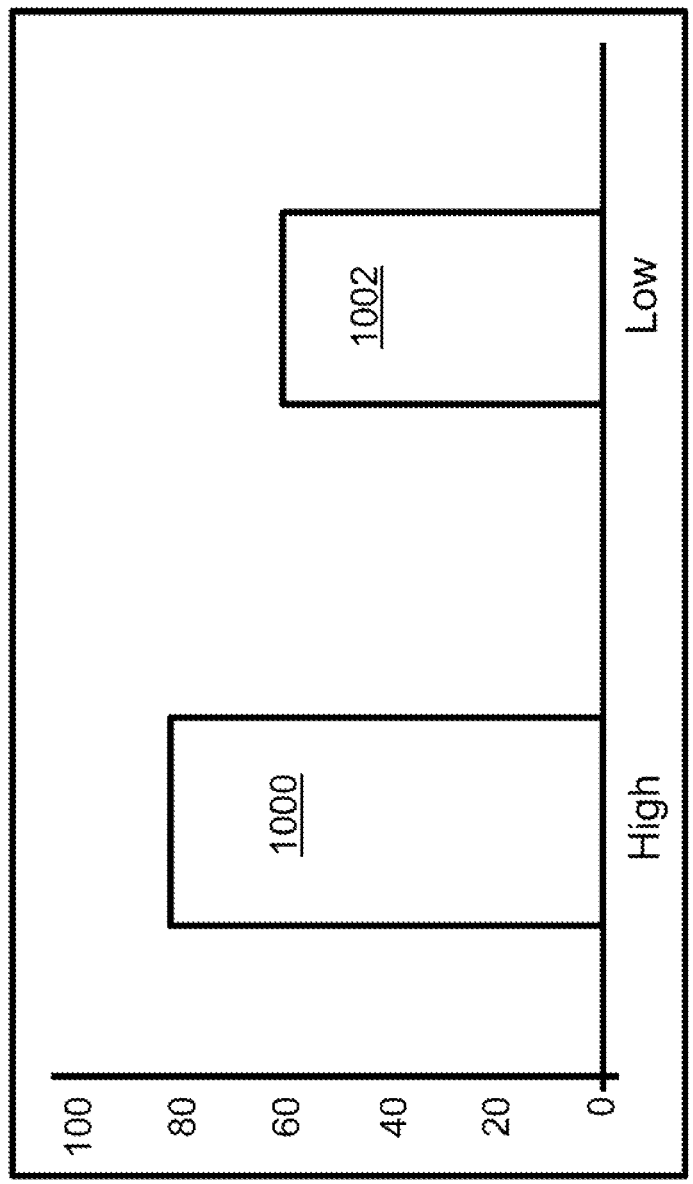
FIG. 10 illustrates groups of aggressiveness for model fits according to the principles of the present invention.

FIG. 10 depicts the means for the two groups of aggressiveness (high aggressiveness 1000 and low aggressiveness 1002) for model fits. Since there was one model instance per subject, there were 53 high aggressiveness model instances and 26 low aggressiveness model instances. The groups are well separated (t-test, p<0.05). The model fits capture the qualitative difference between aggressive and conservative human subjects. The average model response fitting the aggressive group of humans is more aggressive than the average model response fitting the conservative group of humans.

(5.2.2) Subgroups for Loss Sensitivity/Insensitivity

Figure 11:
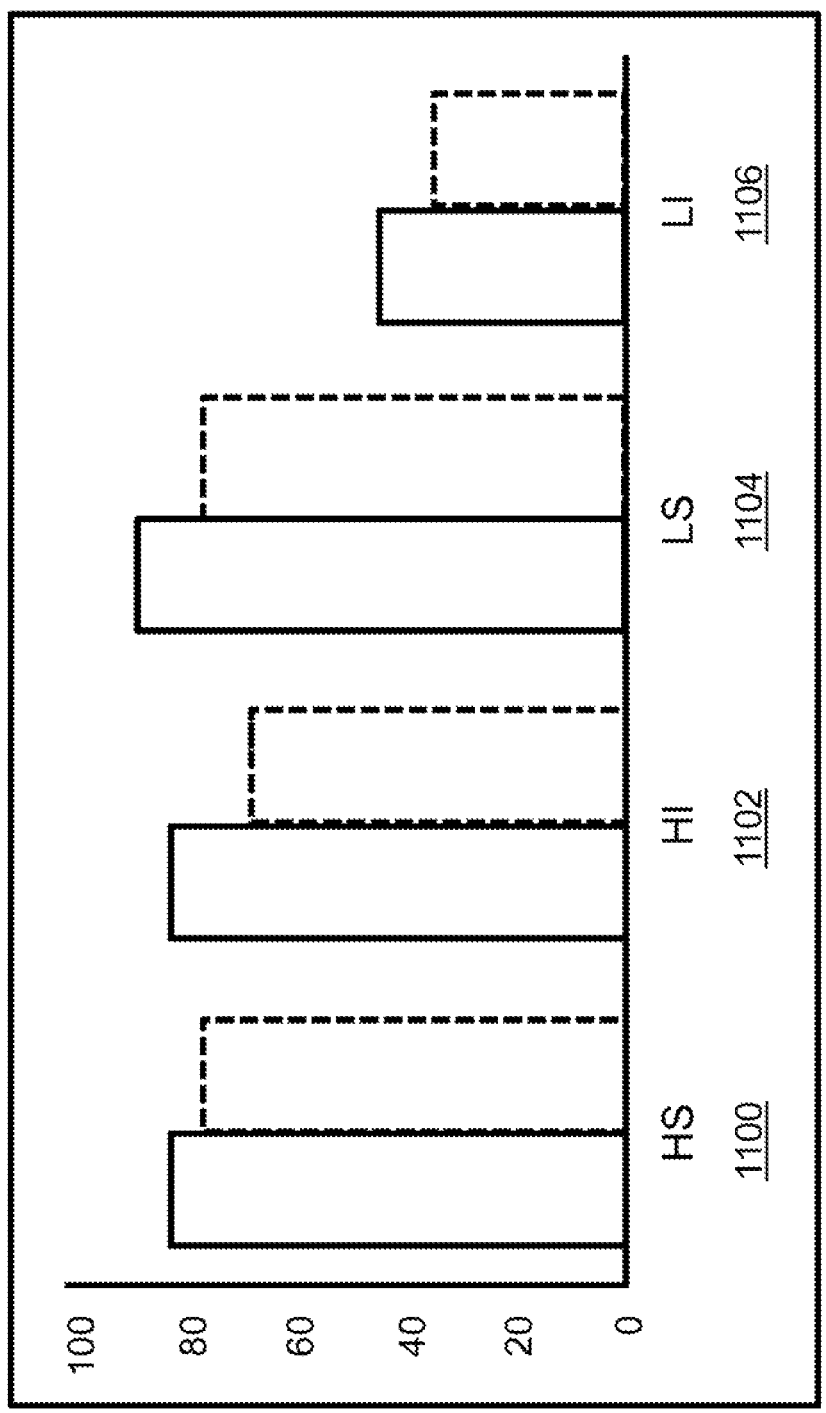
FIG. 11 illustrates on and after error aggressiveness for model fits according to the principles of the present invention.

FIG. 11 illustrates loss sensitivity for high aggressiveness loss sensitive (HS) 1100, high aggressiveness loss insensitive (III) 1102, low aggressiveness loss sensitive (LS) 1104, and low aggressiveness loss insensitive subjects (LI) 1106 by plotting $\overline{A}_{on\ error}$ (represented by solid line bars) and $\overline{A}_{after\ error}$ (represented by dashed line bars) for model fits. Since there was one model instance per subject, there were 12, 41, 13, and 13 models instances for each group. The model fits capture the qualitative difference between loss sensitive (elements 1100 and 1104) and loss insensitive (elements 1102 and 1106) human subjects. The average model response fitting the loss sensitive group of humans decreased their level of aggressiveness after an error, as indicated by shorter dashed lines bars compared to the solid line bars in elements 1100 and 1104. Similarly, the average model response fitting the loss insensitive group of humans maintained or increased their level of aggressiveness after an error. While this change is not apparent with lumped plots in 1102 and 1106, before-after plots or plots of the paired difference in the change in aggressiveness on and after an error illustrate this loss insensitivity. More importantly, significant differences were found in the sensitive groups and the low insensitive group (paired t-test, $p<0.05$), but not the high insensitive group (paired t-test, $p>0.05$).

(5.2.3) Optimization

Table 5 below lists the average parameter values that produced the least error for model fits for each group of human subjects. Parameter values averaged within aggressiveness level (high and low) and loss sensitivity (loss sensitive and loss insensitive) are also listed.

TABLE 5

Parameter value averages for model fits.

| Group | Average Bias to PM+ | Average Loss Sensitivity | Average Learning Rat |
|---|---|---|---|
| High aggressiveness loss sensitive (HS) | 0.71667 | 1.2 | 0.38333 |
| High aggressiveness loss insensitive (HI) | 0.66341 | 1.5073 | 0.40976 |
| Low aggressiveness loss sensitive (LS) | 0.49231 | 1.8923 | 0.63077 |
| Low aggressiveness loss insensitive (LI) | 0.53846 | 0.87692 | 0.35385 |
| Average high aggressiveness | 0.69004 | 1.3537 | 0.39655 |
| Average low aggressiveness | 0.51538 | 1.3846 | 0.49231 |
| Average loss sensitive | 0.60449 | 1.5461 | 0.50705 |
| Average loss insensitive | 0.60094 | 1.1921 | 0.38181 |

For model fits to the high aggressiveness group of human subjects, a larger bias to PM+ as well a slightly lower learning rate relative to model fits to the low aggressiveness groups of human subjects is seen. This matches the intuition that a high bias to PM+ should lead to more PM+ choices initially. Furthermore, with a lower learning rate, aggressive model fits would continue to be aggressive in the face of errors or losses. There is no significant difference for loss sensitivity between model fits for high versus low aggressiveness levels. For model fits to the loss sensitive group of humans, a larger loss sensitivity parameter and a higher learning rate relative to model fits to the loss insensitive group of humans is seen. This matches the intuition that a high loss sensitivity parameter should lead to more conservative choices after errors or losses. Furthermore, with a higher learning rate, loss sensitive model fits would adapt more quickly in the face of errors. There is no significant difference for bias to PM+ between model fits for loss sensitive versus loss insensitive groups.

To summarize, probability matching has been studied in binary assignment tasks such as the n-armed bandit, as described in Literature Reference Nos. 3 and 7. In the present invention, however, biases in an analog resource allocation task based on the n-armed bandit task adapted to military planning are studied. Analyzing behavioral data collected from MITRE (see Literature Reference No. 17 for a description of the MITRE data), degrees of probability matching and loss sensitivity across human subjects were found. Varying degrees of probability matching and loss sensitivity biases in human subjects were simulated using a recent model which simulates interactions between neuromodulatory and prefrontal areas. The degree of probability matching and loss sensitivity for the four groups—high aggressiveness loss sensitive, high aggressiveness loss insensitive, low aggressiveness loss sensitive, and low aggressiveness loss insensitive—was qualitatively fit. High (or low) aggressive levels correspond to less (or more) susceptibility to probability matching. Loss sensitivity (or loss insensitivity) corresponds to more (or less) susceptibility to loss aversion.

There are several differences between the system according to the principles of the present invention and prior work. Unlike the model of the present invention, prior work is rooted primarily in behavior. The behavior of interest deals with a transition from decisions which are exploratory in nature (uncertain reward) to exploitative decisions (choosing a space with more priors and knowledge of what to expect). For example, the work of Lee et al. (see Literature Reference No. 7) proposes a 'tau-switch' model in which subjects explore until they reach a certain number of trials tau, after which they exploit the option which yields the highest expected rewards. The 'tau switch' model is compared to other strategies for choices to explore or exploit on a given trial, including memoryless win-stay-lose-switch (see Literature Reference No. 14) and variations on choosing to exploit with a certain probability, known as epsilon greedy algorithms (see Literature Reference No. 14). In the earlier work of Erev and Baron (see Literature Reference No. 3) various reinforcement learning strategies had been weighted and coefficients chosen via regression to best match subject behavior. They use reinforcement learning models adapted from Literature Reference No. 14.

Here, biological constraints inform model capabilities and, hence, have the potential of providing more detailed predictions of behavior. In particular, one is able to make predictions about lesions and neurotransmitter imbalances (see Literature Reference No. 2) based on recent findings implicating OFC and ACC in decision making (e.g., Literature Reference Nos. 12 and 13). The system according to the principles of the present invention applies to a larger body of tasks. The present invention handles more complex analog resource allocation tasks, whereas the state-of-the-art deals with binary n-arm bandit tasks. Consequently, the system described herein can be used to model a rich variety of phenomena. As with prior work, loss aversion can be accounted for. However, the system according to the principles of the present invention can also account for variations of behaviors after a loss is experienced. In other words, the model of the present invention allows for strategies to change (i.e., exploring vs. exploiting). The present invention can also be used to account for phenomena, such as persistence of discredited evidence which corresponds to low learning rates. The model can, therefore, be used to generate a predicted response of a human subject to an event such as being presented with one or more resource allocation tasks. The model can also be used to assign a personality profile to a human subject. For example, the personality profile may be selected from one of the following categories: High aggressiveness loss sensitive (HS); High aggressiveness loss insensitive (HI); Low aggressiveness loss sensitive (LS); Low aggressiveness loss insensitive (LI)

What is claimed is:

1. A system for modeling probability matching and loss sensitivity in human subjects, the system comprising:
one or more processors and a non-transitory computer-readable medium having executable instructions encoded thereon such that when executed, the one or more processors perform operations of:
extracting a set of features related to probability matching and loss sensitivity from collected human responses;
processing the set of features from the collected human responses with a genetic algorithm to fit the collected human responses with a set of neural network model instances, wherein the set of neural model instances are derived from a neural model which captures interactions between neuromodulators and prefrontal cortex for decision making;
generating a set of model parameters from the genetic algorithm;
generating a model of human behavior based on the set of model parameters, the model being at least one of an explanatory model and a predictive model;
using the model, determining a bias of a subject's data towards probability matching and loss sensitivity; and
automatically generating and outputting a customized instruction to intervene against the bias of the subject's data.

2. The system as set forth in claim 1, wherein the model parameters are selected from a group consisting of: bias to an aggressive strategy, loss sensitivity, and learning rate.

3. The system as set forth in claim 1, wherein the one or more processors further perform an operation of quantifying a level of aggressiveness in the collected human responses for a trial according to the following:

$$IG_t = h_{probabilities,t} - h_{resource\ allocations,t},$$

where $IG_t$ is the information gain on a trial t and $h_{x,t}$ is the entropy of probability distribution x on a trial t, wherein the quantity can be averaged across all trials to derive a measure of average aggressiveness for a subject according to the following:

$$\overline{A}_{all\ trials} = \frac{1}{10}\sum_{t=1}^{t=10} H(IG_t),$$

where H represents a Heaviside step function.

4. The system as set forth in claim 1, wherein the one or more processors further perform an operation of quantifying a sensitivity to loss in the collected human responses by averaging a number of aggressive trials on an error trial ($\overline{A}_{on\ error}$) and after an error trial ($\overline{A}_{after\ error}$), and using the difference between the averages to identify the presence of loss sensitivity (LS) according to the following:

$$\overline{A}_{on\ error} = \frac{1}{\|e\|}\sum_e H(IG_e),$$

$$\overline{A}_{after\ error} = \frac{1}{\|e\|}\sum_{e+1} H(IG_{e+1}),$$

$$LS = H(\overline{A}_{on\ error} - \overline{A}_{after\ error})$$

where e is an index of an error trial, (e+1) is an index of an after error trial, and $\|e\|$ is a total number of error trials for a given human subject.

5. A computer-implemented method for modeling probability matching and loss sensitivity in human subjects, the computer-implemented method using one or more processors to perform operations of:
extracting, with the one or more processors, a set of features related to probability matching and loss sensitivity from collected human responses;
processing, with the one or more processors, the set of features from the collected human responses with a genetic algorithm to fit the collected human responses with a set of neural network model instances, wherein the set of neural model instances are derived from a neural model which captures interactions between neuromodulators and prefrontal cortex for decision making;
generating, by the one or more processors, a set of model parameters from the genetic algorithm;
generating, with the one or more processors, a model of human behavior based on the set of model parameters, the model being at least one of an explanatory model and a predictive model;
using the model, determining a bias of a subject's data towards probability matching and loss sensitivity; and
automatically generating and outputting a customized instruction to intervene against the bias of the subject's data.

6. The method as set forth in claim 5, wherein the model parameters are selected from a group consisting of: bias to an aggressive strategy, loss sensitivity, and learning rate.

7. The method as set forth in claim 5, wherein the one or more processors further perform an operation of quantifying a level of aggressiveness in the collected human responses for a trial according to the following:

$$IG_t = h_{probabilities,t} - h_{resource\ allocations,t},$$

where $IG_t$ is the information gain on a trial t and $h_{x,t}$ is the entropy of probability distribution x on a trial t, wherein the quantity can be averaged across all trials to derive a measure of average aggressiveness for a subject according to the following:

$$\overline{A}_{all\ trials} = \frac{1}{10}\sum_{t=1}^{t=10} H(IG_t),$$

where H represents a Heaviside step function.

8. The method as set forth in claim 5, wherein the one or more processors further perform an operation of quantifying a sensitivity to loss in the collected human responses by averaging a number of aggressive trials on an error trial ($\overline{A}_{on\ error}$) and after an error trial ($\overline{A}_{after\ error}$), and using the difference between the averages to identify the presence of loss sensitivity (LS) according to the following:

$$\overline{A}_{on\ error} = \frac{1}{\|e\|}\sum_e H(IG_e),$$

$$\overline{A}_{after\ error} = \frac{1}{\|e\|}\sum_{e+1} H(IG_{e+1}),$$

$$LS = H(\overline{A}_{on\ error} - \overline{A}_{after\ error}),$$

where e is an index of an error trial, (e+1) is an index of an after error trial, and $\|e\|$ is a total number of error trials for a given human subject.

9. A computer program product for modeling probability matching and loss sensitivity in human subjects, the computer program product comprising:
   computer-readable instructions stored on a non-transitory computer-readable medium that are executable by a computer having a processor for causing the processor to perform operations of:
   extracting a set of features related to probability matching and loss sensitivity from collected human responses;
   processing the set of features from the collected human responses with a genetic algorithm to fit the collected human responses with a set of neural network model instances, wherein the set of neural model instances are derived from a neural model which captures interactions between neuromodulators and prefrontal cortex for decision making;
   generating a set of model parameters from the genetic algorithm;
   generating at least one of an explanatory and predictive model of human behavior based on the set of model parameters;
   using the model, determining a bias of a subject's data towards probability matching and loss sensitivity; and
   automatically generating and outputting a customized instruction to intervene against the bias of the subject's data.

10. The computer program product as set forth in claim 9, wherein the model parameters are selected from a group consisting of: bias to an aggressive strategy, loss sensitivity, and learning rate.

11. The computer program product as set forth in claim 9, further comprising instructions for causing one or more processors to perform an operation of quantifying a level of aggressiveness in the collected human responses for a trial according to the following:

$$IG_t = h_{probabilities,t} - h_{resource\ allocations,t},$$

where $IG_t$ is the information gain on a trial t and $h_{x,t}$ is the entropy of probability distribution x on a trial t, wherein the quantity can be averaged across all trials to derive a measure of average aggressiveness for a subject according to the following:

$$\overline{A}_{all\ trials} = \frac{1}{10}\sum_{t=1}^{t=10} H(IG_t),$$

where H represents a Heaviside step function.

12. The computer program product as set forth in claim 9, further comprising instructions for causing one or more processors to perform an operation of quantifying a sensitivity to loss in the collected human responses by averaging a number of aggressive trials on an error trial ($\overline{A}_{on\ error}$) and after an error trial ($\overline{A}_{after\ error}$), and using the difference between the averages to identify the presence of loss sensitivity (LS) according to the following:

$$\overline{A}_{on\ error} = \frac{1}{\|e\|}\sum_{e} H(IG_e),$$

$$\overline{A}_{after\ error} = \frac{1}{\|e\|}\sum_{e+1} H(IG_{e+1}),$$

$$LS = H(\overline{A}_{on\ error} - \overline{A}_{after\ error}),$$

where e is an index of an error trial, (e+1) is an index of an after error trial, and $\|e\|$ is a total number of error trials for a given human subject.

13. The system as set forth in claim 1, wherein the one or more processors further perform an operation of:
   based on the model, assigning a personality profile to a human subject whose responses were used to generate the model.

14. The system as set forth in claim 1, wherein the one or more processors further perform an operation of:
   using the model, generating a predicted response of a human subject to an event.

* * * * *